United States Patent
Akhavain Mohammadi et al.

(10) Patent No.: US 11,757,753 B2
(45) Date of Patent: Sep. 12, 2023

(54) LINK STATE STEERING

(71) Applicant: HUAWEI TECHNOLOGIES CO., LTD., Shenzhen (CN)

(72) Inventors: Mehdi Arashmid Akhavain Mohammadi, Ottawa (CA); Michael Mayer, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 161 days.

(21) Appl. No.: 17/184,825

(22) Filed: Feb. 25, 2021

(65) Prior Publication Data

US 2022/0272022 A1    Aug. 25, 2022

(51) Int. Cl.
*H04L 45/02* (2022.01)
*H04L 45/12* (2022.01)
*H04L 45/00* (2022.01)

(52) U.S. Cl.
CPC ............ *H04L 45/02* (2013.01); *H04L 45/123* (2013.01); *H04L 45/32* (2013.01)

(58) Field of Classification Search
CPC ........ H04L 45/02; H04L 45/123; H04L 45/32
See application file for complete search history.

(56) References Cited

U.S. PATENT DOCUMENTS

| | | |
|---|---|---|
| 7,177,295 B1 | 2/2007 | Sholander |
| 2001/0032272 A1 | 10/2001 | Fujita |
| 2005/0094620 A1 | 5/2005 | Calcev |
| 2007/0047462 A1* | 3/2007 | Collins ................... H04L 45/54 370/254 |
| 2007/0091828 A1 | 4/2007 | Ashwood-Smith |
| 2008/0056157 A1 | 3/2008 | Retana |
| 2008/0144644 A1 | 6/2008 | Allan |
| 2009/0316617 A1 | 12/2009 | Ichinohe |

(Continued)

FOREIGN PATENT DOCUMENTS

| | | |
|---|---|---|
| CN | 101682552 A | 3/2010 |
| CN | 103210617 A | 7/2013 |

(Continued)

OTHER PUBLICATIONS

Internet Engineering Task Force (IETF), Standards Track document No. RFC 5709; "OSPFv2 HMAC-SHA Cryptographic Authentication"; Oct. 2009.

(Continued)

*Primary Examiner* — Pao Sinkantarakorn
*Assistant Examiner* — Kabir U Jahangir

(57) ABSTRACT

A method for distributing link state information in a network includes receiving, by a first node, from a second node, a first control message including the link state information and a first set of forwarding instructions for selecting a network interface from a plurality of network interfaces to use to further propagate the link state information. The method also includes sending over the selected network interface, by the first node, to a third node, based on the first set of forwarding instructions and a status of the plurality of network interfaces, a second control message including the link state information and a second set of forwarding instructions. The second set of forwarding instructions is based on the first set of forwarding instructions and a positional location of the third node within the network.

20 Claims, 14 Drawing Sheets

(56) References Cited

U.S. PATENT DOCUMENTS

| | | | |
|---|---|---|---|
| 2012/0075988 A1* | 3/2012 | Lu | H04L 45/28 370/218 |
| 2012/0170449 A1 | 7/2012 | Nakash | |
| 2013/0070637 A1* | 3/2013 | Lindem, III | H04L 45/12 370/254 |
| 2013/0198558 A1 | 8/2013 | Rao et al. | |
| 2013/0208624 A1 | 8/2013 | Ashwood-Smith | |
| 2013/0250808 A1 | 9/2013 | Hui | |
| 2014/0254427 A1* | 9/2014 | Chen | H04L 45/02 370/254 |
| 2014/0369233 A1* | 12/2014 | Lin | H04L 45/32 370/254 |
| 2015/0092594 A1* | 4/2015 | Zhang | H04W 40/246 370/254 |
| 2015/0244607 A1 | 8/2015 | Han | |
| 2016/0337233 A1 | 11/2016 | Lu et al. | |
| 2018/0183706 A1* | 6/2018 | Przygienda | H04L 49/1515 |
| 2019/0181947 A1 | 6/2019 | Schloemer | |
| 2019/0312805 A1* | 10/2019 | Li | H04L 45/028 |
| 2020/0220803 A1 | 7/2020 | Zheng et al. | |
| 2021/0119910 A1* | 4/2021 | Chen | H04L 45/32 |

FOREIGN PATENT DOCUMENTS

| | | |
|---|---|---|
| CN | 102273141 B | 9/2015 |
| CN | 104521192 B | 1/2018 |
| CN | 112272142 A | 1/2021 |
| WO | 2008130620 A1 | 10/2008 |
| WO | 2020165627 A1 | 8/2020 |

OTHER PUBLICATIONS

Internet Engineering Task Force (IETF), Standards Track document No. RFC 6549; "OSPFv2 Multi-Instance Extensions"; Mar. 2012.

Internet Engineering Task Force (IETF), Standards Track document No. RFC 6860; "Hiding Transit-Only Networks in OSPF"; Jan. 2013.

Internet Engineering Task Force (IETF), Standards Track document No. RFC 7474; "Security Extension for OSPFv2 When Using Manual Key Management"; Apr. 2015.

Internet Engineering Task Force (IETF), Standards Track document No. RFC 7503; "OSPFv3 Autoconfiguration"; Apr. 2015.

Jacquet et al., Optimized Link State Routing Protocol for Ad Hock Networks, IEEE 2001, pp. 62-68.

Clausen et al., Optimized Link State Routing Protocol (OLSR), Network Working Group, Request for Comments: 3626, Oct. 2003, 75 pages.

Goyal et al., Improving Convergence Speed and Scalability in OSPF: A Survey, IEEE Communications Surveys & Tutorials, vol. 14, No. 2, Second Quarter 2012, pp. 443-463.

Yan et al., A Novel Routing Scheme for LEO Satellite Networks based on Link State Routing, IEEE 17th International Conference on Computational Science and Engineeing 2014, pp. 876-880.

Moy, J., OSPF Version 2, Network Working Group, Ascend Communications, Inc., Request For Comments: 2328, Apr. 1998, 244 pages.

Sheth et al., OSPF Hybrid Broadcast and Point-to-Multipoin Interface Type, Internet Engineering Task Force (IETF), Request For Comments: 6845, Jan. 2013, 9 pages.

Zhang, et al., OSPF Two-Part Metric, Internet Engineering Task Force (IETF), Request for Comments: 8042, Dec. 2016, 9 pages.

Coltun et al., OSPF for IPv6, Network Working Group, Request for Comments: 5340, Jul. 2008, 94 pages.

Lindem, et al., OSPFv3 Link State Advertisement (LSA) Extensibility, Internet Engineering Task Force, Request for Comments: 8362, Apr. 2018, 33 pages.

\* cited by examiner

LINK STATE STEERING

CROSS-REFERENCE TO RELATED APPLICATIONS

This is the first application filed for the present invention.

FIELD OF THE INVENTION

The present invention pertains to data networks, such as but not necessarily limited to satellite mesh networks, and in particular to a method and apparatus for communicating link state information between nodes of such data networks.

BACKGROUND

Embodiments of the invention address methods to improve routing of packet based data over a network with dynamically changing topology. In particular, embodiments address applications of non-terrestrial networks, such as satellite networks, in order to provide global communications services that may not be supported by terrestrial networks.

Network routing protocols in modern communications networks have evolved to favour link-state protocols such as OSPF or IS-IS. These generally provide better network performance than distance-vector protocols used in earlier packet based data networks and are expected to be used in some modified form in satellite based data networks.

In a link state protocol routers create and maintain routing data bases by calculating network routes based on link adjacencies that exist between routers in that network. A key requirement is a function to allow the exchange of adjacency information to occur, both at initial network setup and also in the case of a change in the network topology, which could occur, for example, when a link fails. Typically, this is performed using protocols derived specifically for this purpose and the messages that are exchanged are called link state advertisement (LSA) messages. When LSAs are received, routers can derive the network topology and compute the paths needed to reach a specific address or a set of addresses. If all routers have the same link state information and use the same topology algorithms, each router will produce accurate route calculations, since they will essentially will have been accurately recreate the network topology.

When a link failure occurs the topology of the network changes. To enable detection of topology changes, link state protocols send periodic messages. In the event that a message is not detected, the link state protocols will declare a link failure. When a failure is declared at a router, the router will begin to notify all nodes directly connected to it of the failure via a link state advertisement message and will then update its routing database to reflect the loss of the link. Each node receiving the updated link information will also re-compute their routing information data base and then notify all nodes that are directly attached to it. This process will continue at subsequent nodes until all nodes have been reached. The process is often referred to as flooding, as the updates flow away from the location of the fault.

Until each router has received the updated link state information, and updated its routing information, the network will operate in a degraded mode, since the topology in some routers may not match the actual network topology. In this case, packet loss may occur. The duration of this degraded mode will last until all routers have the same topology information and is referred to as the convergence time. As can be expected, the convergence time will vary with the size of the network. A particularly challenging case is that where the network is large and experiences very frequent outages. If the inter-outage period is on the order of the convergence time, then the network may never fully converge. Large low earth orbit satellite networks are considered large by wireline standards and will experience periodic link outages caused by the topology of the network which includes links between satellites that are broken and reformed as satellites pass each other travelling in opposite directions.

Improving convergence time will improve overall network performance following a link failure event. Since the link state advertisement protocols send periodic messages to enable detecting link failures, one way to achieve faster convergence time is to reduce the time between updates. This will improve the speed of detection of a fault, at the expense of additional messaging overhead and processing. However, once detected, the flooding may still take considerable time to complete.

Another method to improve convergence time is by reducing the size of the network, but this requires segmenting the network into a number of smaller sub-networks and may not always be suitable as, for example in the case of mobile ad-hoc networks (MANETs).

In response to failures, link state advertisement messages may often be duplicated. Depending on the network topology and the number of interfaces present on a network node, the link advertisements caused by a link failure may propagate to a node via multiple distinct paths. In many cases, this redundancy can be viewed as a way of ensuring reliability of the flooding process. However, in other cases, the bandwidth consumed, and processing required may be excessive from the perspective of network node performance.

In some cases, the network architecture itself is problematic when applying wireline link-state protocols. In the case of MANETs, where a large number of radio nodes can be closely located, the creation of special nodes such as multipoint relays (MPRs), is a way of reducing the link state messages and optimizing a link state protocol to address specific issues in radio based ad-hoc networks.

One important aspect of network flooding and convergence time is that the convergence time is defined based on the time required for all nodes to complete and update of their routing tables in response to a single network failure. Although the network is considered to be operating in a degraded mode, the impact to a specific flow within the network may not experience degraded performance for the full duration of the convergence time unless the flow traverses the last router that is updated. The impact on traffic during a flooding event depends largely on the traffic patterns and the location of the failures. Typically, traffic that is close to a failure may be impacted but updating the routing tables on routers within a few hops of the failure may be fast. On the other hand, if the traffic patterns are such that a large number of flows pass between to relatively large logical gateways (for example, traffic flowing between New York and Washington, or New York and London, or Beijing and Wuhan) a failure closer to one gateway (for example, close to New York) may result in an outage for a significant period of time, as the link state updates will need to propagate to the full length of the connection path. There have been methods proposed to provide an express route to reduce the flooding time by sending a link state update directly to a remote node to signal the far end node to begin a flooding operation at that distant point and thus reduce the overall flooding duration.

Therefore, there is a need for a method and apparatus for reducing the number of LSA messages required while still having an adequate convergence time following the detection of a broken or degraded link, that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for limiting and reducing the number of LSA messages by controlling the routing distribution of LSAs. Embodiments provide for the routing, or "steering," of LSA messages around network link failures on a local scale, subject to higher level general distribution principles and rules applicable to the network based on network topology and the position of network nodes within the network. Embodiments provide mechanisms and methods that allows a network node that detects a failure to purposely steer LSAs around the known break, thus allowing flooding to reach all nodes without resorting to the duplication of LSAs experienced using a traditional flooding protocol. In further embodiments applicable to mesh networks such as satellite networks, LSAs may be routed to take into consideration the specific topology associated with satellite orbits.

In accordance with embodiments of the present invention, there is provided a method for distributing link state information in a network, the method includes receiving, by a first node, from a second node, a first control message including the link state information and a first set of forwarding instructions for selecting a network interface from a plurality of network interfaces to use to further propagate the link state information. The method also includes sending over the selected network interface, by the first node, to a third node, based on the first set of forwarding instructions and a status of the plurality of network interfaces, a second control message including the link state information and a second set of forwarding instructions. The second set of forwarding instructions based on the first set of forwarding instructions and a positional location of the third node within the network.

This provides the technical benefit of improving the efficiency of the distribution of link state information in a network and allows the link state information to be selectively distributed to reduce network congestion and reduces the processing requirements of each node.

In further embodiments, the plurality of network interfaces include a network interface connected in a first direction and a network interface in a second direction, and the method further includes the first node determining a status of each of the plurality of network interfaces.

This provides the technical benefit of allowing dividing network interfaces into groups to further optimize the distribution of link state information.

In further embodiments, the first set of forwarding instructions instructs the first node to select one of the plurality of network interfaces connected in the first direction, and the method further includes transferring the first set of forwarding instructions to the second set of forwarding instructions.

This provides the technical benefit of forwarding instructions in a particular direction of the network.

In further embodiments, the first set of forwarding instructions instructs the first node to select a first of the plurality of network interfaces connected in the first direction and a second of the plurality of network interfaces connected in the second direction. The method further includes transferring the first set of forwarding instructions to the second set of forwarding instructions, where the second control message is sent on one of the plurality of network interfaces in the second direction, and sending over a selected network interface in the first direction, to a fourth node, a third control message including the link state information and a third set of forwarding instructions. The third set of forwarding instructions instruct the fourth node to forward the link state information in the first direction.

This provides the technical benefit of allowing a network node to instruct downstream nodes depending on the direction that the downstream nodes are located in the network.

In further embodiments, the second set of forwarding instructions are derived from the first set of forwarding instructions modified based on the status of one or more of the plurality of network interfaces.

This provides the technical benefit of allowing the first node to modify forwarding instructions based on its knowledge of local link conditions.

In further embodiments, the network has a grid topology, and the plurality of network interfaces are interfaces pointing in positional directions.

This provides the technical benefit of applying embodiments in a wide variety of networks using a grid topology.

In further embodiments, the network is a satellite network, the first node is a satellite positioned in an orbit of the network, the first direction is within the orbit, and the second direction is between the orbit and an adjacent orbit of the network.

This provides the technical benefit of applying embodiments in a satellite networks to efficiently distribute link state information.

In further embodiments, the first set of forwarding instructions is communicated using at least one of the following techniques; flags, type-length-value (TLVs), structures, objects, or bitsets which provides the technical benefit of allowing forwarding instructions to be communicated using a variety of ways.

In further embodiments, the first set of forwarding instructions includes an identifier for selectively enabling or suppressing the propagation of the link state information over each network interface which provides the technical benefit of additional control over the distribution of link state information.

In accordance with embodiments of the present invention, there is provided a network node configured to distribute link state information in a network. The network node includes a processor coupled to a plurality of network interfaces and a computer readable storage medium. The storage medium stores instructions that when executed by the processor, cause the network node to receive from a second node, a first control message including the link state information and a first set of forwarding instructions for selecting a network interface from the plurality of network interfaces to use to further propagate the link state information. The network node also sends over the selected network interface to a third node, based on the first set of forwarding instructions and a status of the plurality of network interfaces, a second control message including the link state information and a second set of forwarding instructions. The second set of forwarding instructions are based on the first set of forwarding instructions and a positional location of the third node within the network.

This provides the technical benefit of an apparatus, the network node, to distribute link state information in the network.

In further embodiments, the plurality of network interfaces include a network interface connected in a first direction and a network interface in a second direction, with the network node determining a status of each of the plurality of network interfaces.

In further embodiments, the first set of forwarding instructions instructs the network node to select one of the plurality of network interfaces connected in the first direction, and the instructions, when executed by the processor, further causing the network node to transfer the first set of forwarding instructions to the second set of forwarding instructions.

In a further embodiment, the first set of forwarding instructions instructs the network node to select a first of the plurality of network interfaces connected in the first direction and a second of the plurality of network interfaces connected in the second direction. Also, the instructions, when executed by the processor, further causing the network node to transfer the first set of forwarding instructions to the second set of forwarding instructions where the second control message is sent on one of the plurality of network interfaces in the second direction. The network node also sends over a selected network interface in the first direction, to a fourth node, a third control message including the link state information and a third set of forwarding instructions. The third set of forwarding instructions instruct the fourth node to forward the link state information in the first direction.

In further embodiments, the second set of forwarding instructions are derived from the first set of forwarding instructions modified based on the status of one or more of the plurality of network interfaces.

In further embodiments, the network has a grid topology, and the plurality of network interfaces are interfaces pointing in positional directions.

In further embodiments, the network is a satellite network, the network node is a satellite positioned in an orbit of the network, and the first direction is within the orbit, and the second direction is between the orbit and an adjacent orbit of the network.

In further embodiments, the first set of forwarding instructions is communicated using at least one of the following techniques; flags, type-length-value (TLVs), structures, objects, or bitsets.

In further embodiments, the first set of forwarding instructions includes an identifier for selectively enabling or suppressing the propagation of the link state information over each network interface.

In accordance with embodiments of the present invention, there is provided a system configured to distribute link state information within a network. The system includes a plurality of nodes including a first node, a second node, and a third node. Each of the plurality of nodes includes a processor coupled to a plurality of network interfaces and a computer readable storage medium. The storage medium stores instructions that when executed by the processor, cause the plurality of nodes to receive, by the first node, from the second node a first control message including the link state information and a first set of forwarding instructions for selecting a network interface from the plurality of network interfaces to use to further propagate the link state information. Send over the selected network interface, by the first node, to the third node, based on the first set of forwarding instructions and a status of the plurality of network interfaces, a second control message including the link state information and a second set of forwarding instructions. The second set of forwarding instructions are based on the first set of forwarding instructions and a positional location of the third node within the network.

This provides the technical benefit of providing a system of network nodes where the link state information in the system is updated in an efficient manner.

In a further embodiment, the plurality of network interfaces include a network interface connected in a first direction and a network interface in a second direction, and the network node determines a status of each of the plurality of network interfaces.

Embodiments have been described above in conjunction with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1A:
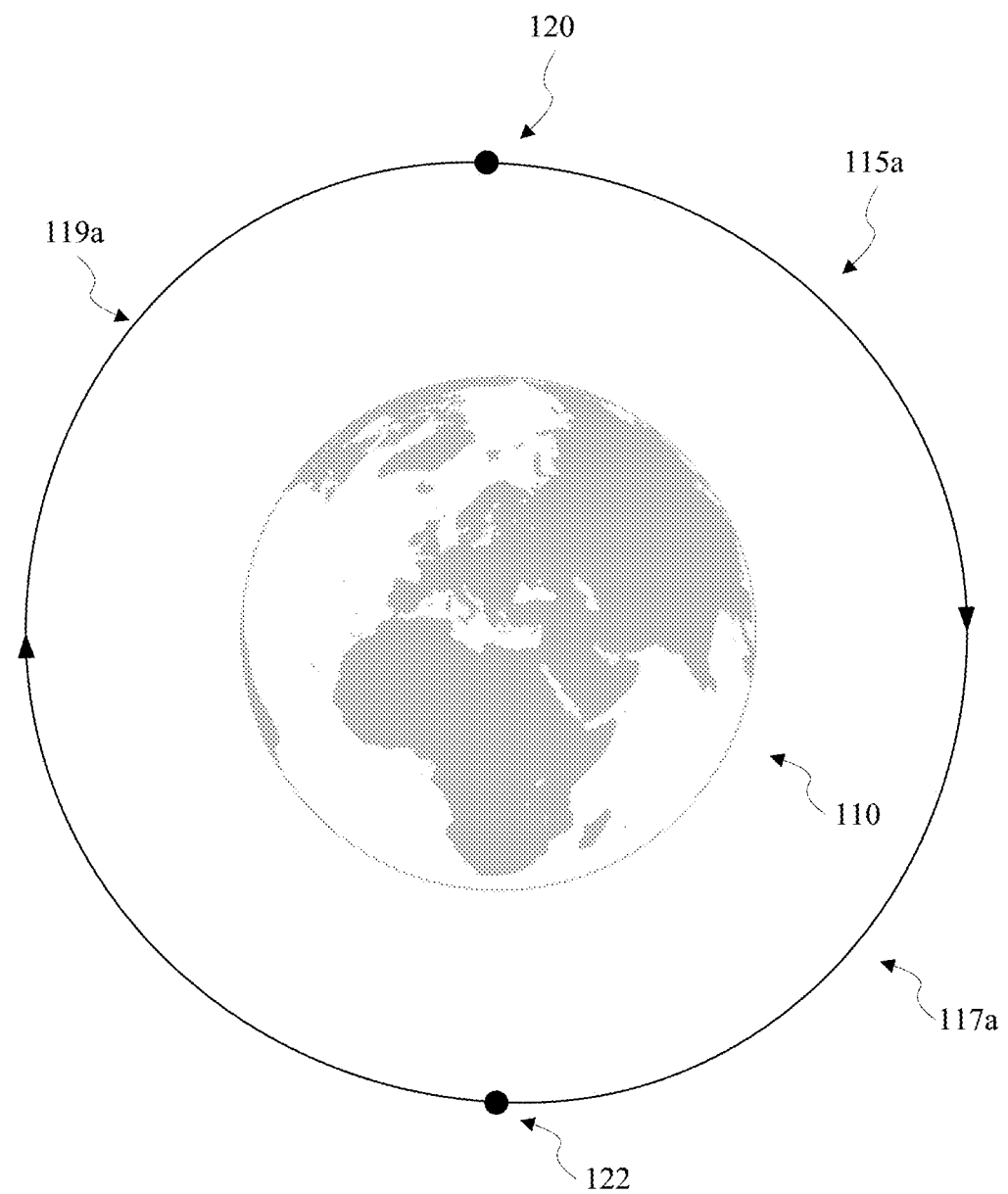
FIG. 1A illustrates the earth with a satellite orbit.

Embodiments of the present invention relate to the updating of link state information in a communication network. Although this can be applied in principle to any type of communication network, the invention is discussed primarily with respect to types of semi ad-hoc networks that include portions having a fixed topology in some locations and other portions where the topology can vary dynamically in time or based on a schedule. It should be noted that embodiments may also include networks that include only portions having fixed topology or networks that include only portions having dynamically varying topologies.

Ad-hoc networks are characterized in that they are distributed with each node having the ability to dynamically route and forward data based on network connectivity and the routing algorithms being used. In embodiments, portions of the network with dynamically varying topology may have links between nodes that only exist at regular or irregular intervals. Examples of semi ad-hoc networks that will be used to illustrate embodiments herein are satellite mesh networks such as low Earth orbit (LEO) satellite networks that include satellites in multiple orbits that may communicate between satellites in the same orbit or in adjoining or adjacent orbits. Communications between satellites within the same orbit will typically have a fixed topology as satellites within the same orbit will be moving in the same direction at the same speed and their relative position to each other will remain substantially constant. On the other hand, satellites in adjacent orbits may be travelling in opposite directions, different altitudes, or at different speeds and a satellite in one orbit may only be in proximity to communicate with another satellite in the other orbit for a period of time less than an orbital period. The period in which these two satellites are in communication may be predictable and periodic. Other examples include satellite networks with orbits at two or more altitudes, and satellites in combination with one or more ground stations. Embodiments can also be applied to other types of networks, for example terrestrial mesh networks with relatively mobile stations, such as cellular user equipment (UE) in an urban environment, or Internet of Things (IoT) networks, such as sensor networks. Embodiments can also be applied to 5G networks, where there may be network routes in common usage in served areas between large cities, or in cloud-based radio access network (C-RAN) serving areas.

In portions of the network where the topology varies dynamically, the increased rate of failure of communication links between nodes will lead to increased flooding as the network distributes LSA messages to update link state information and routing tables in the network. The need to increase flooding efficiency (speed of convergence and reducing the number of LSA messages) when disseminating link state update information becomes increasingly important in terrestrial networks as line data rates increase (e.g., more packets per second). Controlling the number of LSA messages reduces the processing load on the nodes and reduces the amount of bandwidth consumed by messages. Flooding behavior is independent of traffic density, as LSA messages flow away from the source of link faults.

Furthermore, as link failures may lead to increases packet loss until routing tables have been updated at all nodes, to maintain the same overall packet loss performance in a network, a maximum flooding time may have to be enforced. This requirement may be of particular importance in data center applications.

With reference to the example of a satellite mesh network, it is desirable to arrange satellites in a constellation so that they are relatively stationary with respect to one another. FIG. 1A illustrates the earth 110, with a satellite orbit 115a. Multiple satellites may follow this orbit, distributed along the orbit 115a. The orbit passes through two opposing points 120, 122 and is said to include, for purposes of the present discussion, a descending part 117a where the satellite(s) in the orbit passes from point 120 to 122, and an ascending part 119a where the satellite(s) in the orbit passes from point 122 to 120.

Figure 1B:
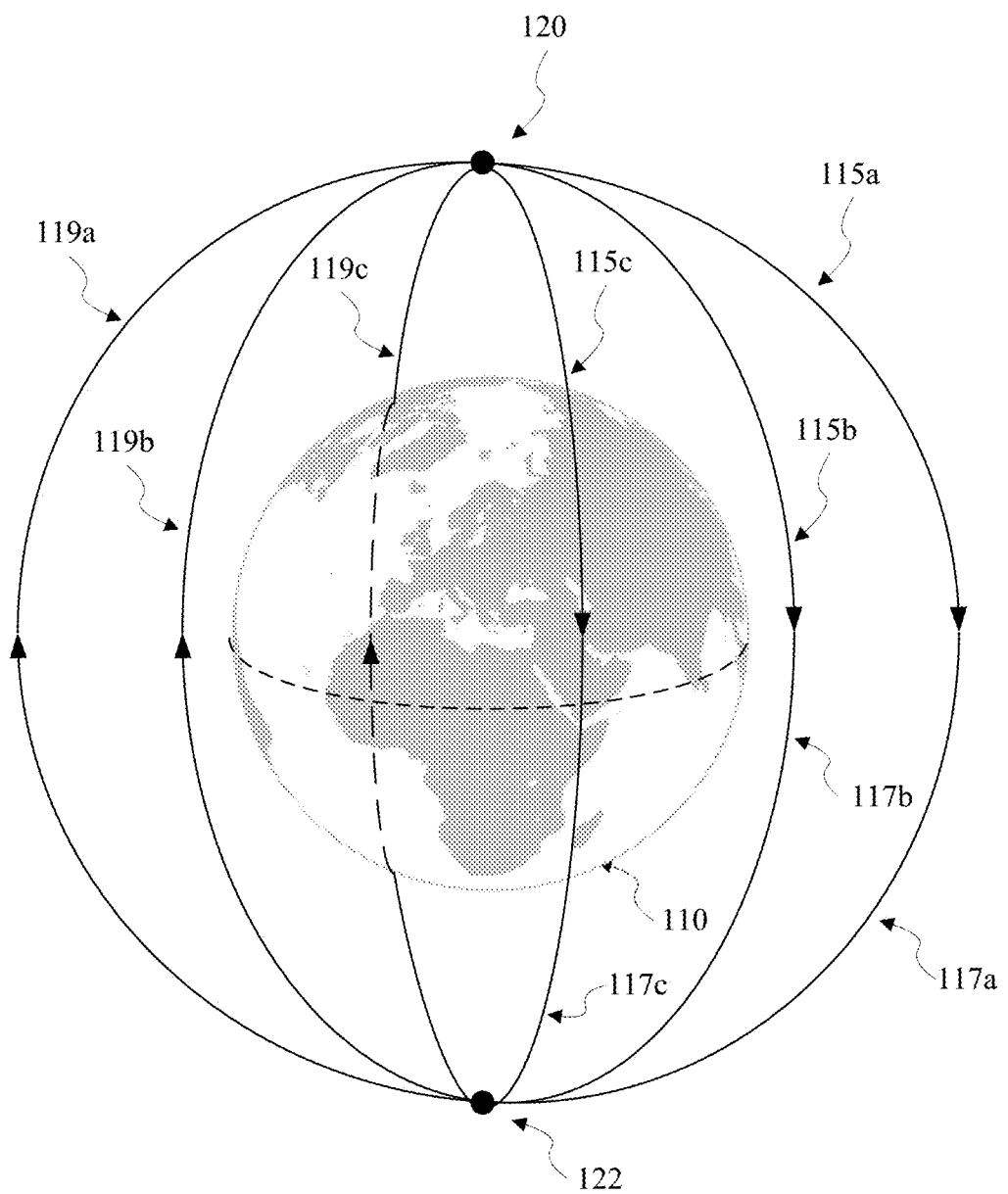
FIG. 1B illustrates the earth as in FIG. 1A with multiple orbits that follow a direction roughly parallel to the earth's meridians.

FIG. 1B illustrates the earth 110 with multiple orbits 115a, 115b, 115c roughly parallel to different meridians. Although three orbits are shown for simplicity, additional such orbits may also be provided. Each orbit passes through points 120 and 122. Each orbit also has a descending part 117a, 117b, 117c and an ascending part 119a, 119b, 119c. However, even though the satellites in each orbit travel in the same direction as the satellites travelling in at least one other neighboring orbit, there are two instances where the satellites in one orbit travel in the opposite direction to the satellites travelling in a neighboring orbit, forming network portions where the topology varies dynamically. For example, the descending part 117a of orbit 115a is adjacent to the ascending part 119c of orbit 115c, and the descending part 117c of orbit 115c is adjacent to the ascending part 119a of orbit 115a. Therefore, communicating between satellites in orbit 115a to satellites in orbit 115c is challenging due to the relative motion between such satellite where they pass in close proximity to each other for only a short period of time. This configuration is referred to as a 'seam' as is defined between the orbits 115a and 115c, and communication across the seam may be technically challenging. In some embodiments, satellites may be arranged in topologies such as a Walker-Delta topology where a plurality of orbits are arranged along meridians and satellites in adjacent orbits are travelling in alternate north-south directions. The use of a Walker-Delta topology results in a seam between each pair of adjacent orbits. Communication links across the seam are temporary, and when such links are made or broken other network nodes need to be aware of this for routing purposes. Disseminating the corresponding link state information via conventional flooding would be problematic due to the rate of messaging required.

Figure 1C:
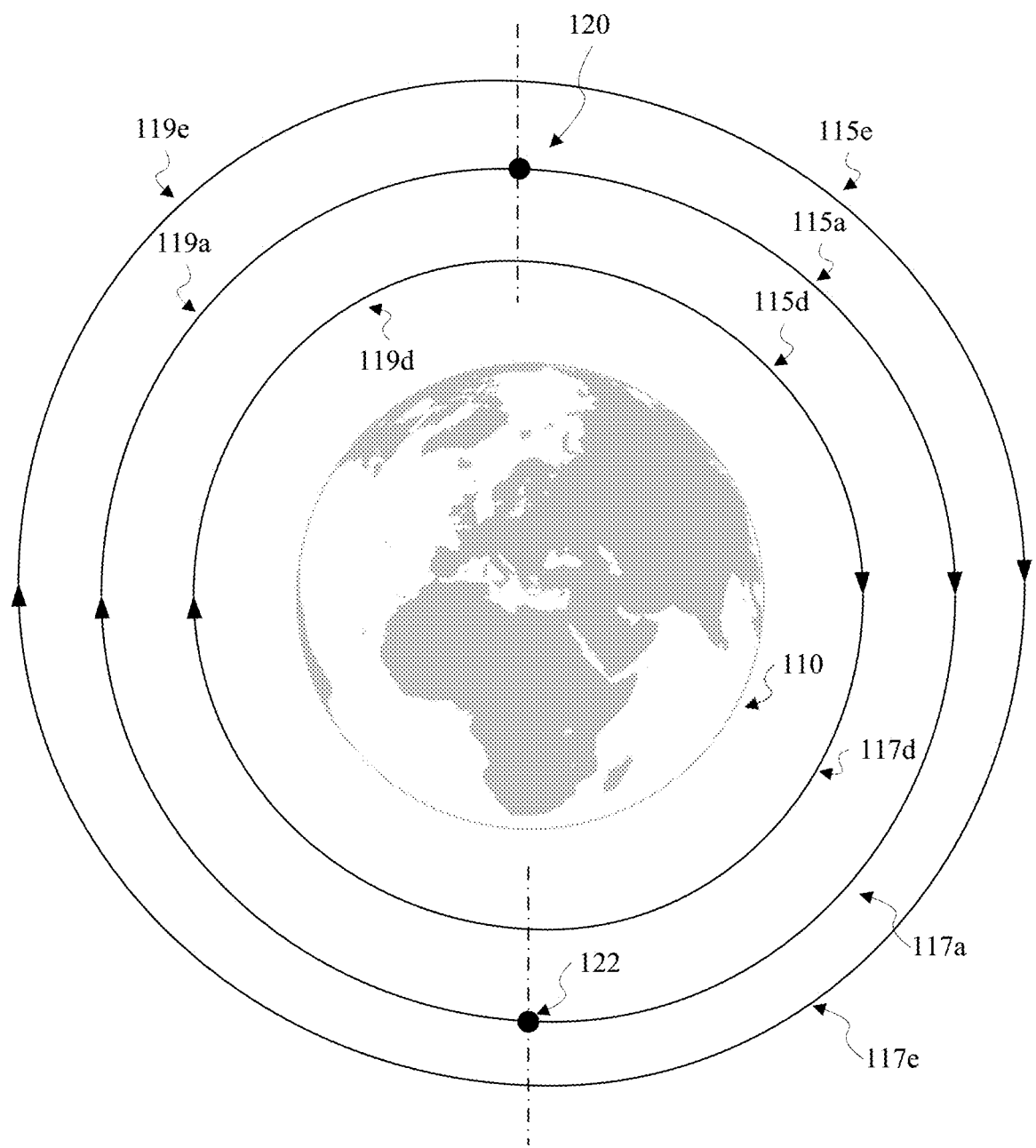
FIG. 1C illustrated the earth as in FIG. 1A with multiple orbits arranged at different altitudes above the earth.

FIG. 1C illustrates the earth 110 with multiple orbits 115a, 115d, 115e arranged along the same meridian at different altitudes. Orbit 115d is at a low altitude, orbit 115a is at a middle altitude, and orbit 115e is at a high altitude. Although three orbits are shown for simplicity, additional such orbits may also be provided at different altitudes. Orbit 115a passes through points 120 and 122. Orbits 115d and 115e pass below or above points 120 and 122, respectively. Each orbit also has a descending part 117a, 117d, 117e and an ascending part 119a, 119d, 119e. In some embodiments, the satellites in each orbit travel in the same direction as the satellites travelling as lower or higher orbits. In other embodiments, the satellites in each orbit travel in the opposite direction as the satellites travelling as lower or higher orbits. Communicating between satellites in orbits of different altitudes travelling in opposite directions is challenging, due to relative motion between such satellites where they pass in close proximity to each other for only a short period of time. Communication links between satellites at different altitudes travelling in opposing directions are temporary, and when such links are made or broken other network nodes need to be aware of this for routing purposes. Disseminating the corresponding link state information via conventional flooding would be problematic due to the rate of messaging required.

It is understood that the example of FIG. 1B and the example of FIG. 1C can be combined in the case of a number of orbits along different meridians and at different altitudes. In some embodiments, nodes may be arranged in geostationary orbits or in geosynchronous orbits where satellites are arranged in the plane of the equator.

For given topology of satellites and satellite orbits, and for combinations and location of ground stations, a satellite will have closest neighbors to communicate link state information with. In cases where satellites are in the same orbital plane, the relationship between adjacent satellites in the same orbital plane will be static at most times. The relationship between these adjacent satellites may change in the case of the failure of a satellite or when a new satellite is added to the same orbital plane, however these are rare occurrences.

In the case of satellites in adjacent orbits such as the example of orbit 115a and orbit 115b in FIG. 1B, a satellite in orbit 115a will have the closest neighboring satellite in orbit 115b though the distance between these two satellites will vary in that they will be closer together near the earth's poles, at points 120 and 122, and farther away at the equator. Furthermore, the bearing from one satellite to the other will switch when the pass over the pole. For example, if a first satellite is to the west of a second satellite during the descending part 117a, 117b of orbits 115a and 115b then the second satellite is to the left of the first satellite with respect to the direction of travel (descending), then though the first satellite will still be to the west of the second satellite on the ascending part 119a, 119b of the orbits, the second satellite will have switched to the right side of the first satellite in the direction of travel (ascending).

With reference to FIG. 1B, in the case where a first satellite is in orbit 115a and a second satellite is in orbit 115c and a seam exists between orbits 115a and 115c, the first satellite will only be close to or adjacent to the second satellite for a brief, but predictable period as dictated by their orbits, locations, and velocities. During this time, the two satellites will be moving in opposite directions. One satellite will be in the ascending portion of its orbit while the other satellite will be in the descending portion of its orbit.

Given a satellite constellation, the time, frequency, position, and distance between any two satellites will be known and this information can be used to predict the topology of the constellation at any time. This information may be used to do routing based on a schedule that takes into account the relative position and velocity of satellites. This information may also be used to determine an optimal flooding algorithm when LSA message flooding occurs.

Figure 2:
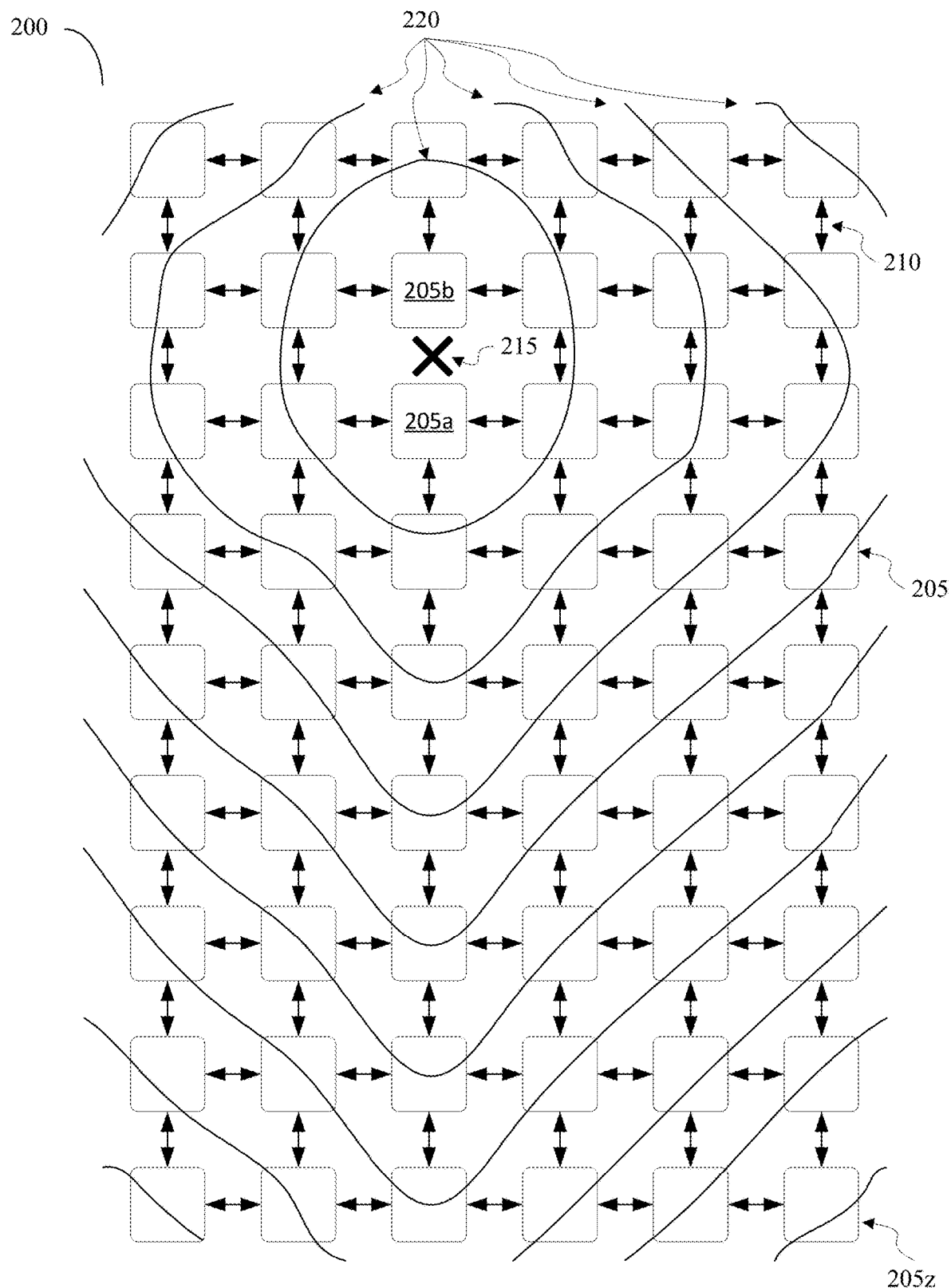
FIG. 2 illustrates a network in which link state information updates are communicated using a conventional flooding protocol.

FIG. 2 illustrates a network 200 in which link state information updates are communicated using a conventional flooding protocol. The network includes nodes 205 (one example node labeled) interconnected to adjacent nodes via links 210 (one example link labeled) in a mesh configuration. Upon failure of a link 215, the nodes 205a, 205b initiate a flooding procedure for propagating new link state information through the network. Link state information contains the links that are available which will indicate that the link 215 is unavailable. In particular, before the failure of link 215, LSA messages sent from nodes 205a and 205b would indicate that each of these two nodes has four links each. After the failure of link 215, LSA messages from nodes 205a and 205b would indicate that each of these two nodes has three links each. The flooding procedure involves each of the nodes 205a and 205b transmitting a control plane LSA message (including the new link state information) to each node that is directly connected to it via a link. The nodes receiving the control plane message process the message and forward the control plane message to further nodes that are adjacent (directly connected via links) to those nodes. Upon receipt of the control plane message, the nodes can also update their routing tables and network topology information. Nodes can avoid propagating the control plane message when the same message has been received before. According to this procedure, the LSA messages are propagated in a hop-by-hop manner outward from the nodes 205a, 205b until all of the network nodes have received the message. The final node to be updated is node 205z. Lines 220 connect nodes that are updated at substantially the same time. These lines 220 represent a wave of propagation of control plane messages outward from the failed link 215 in the flooding protocol.

The network 200 of FIG. 2 is an example of a network that uses a "Manhattan grid" or simply a "grid" topology where each node 205 may be connected to four adjacent nodes in a positional location to a reference node. Network 200 is a generalization of types of networks that may utilize embodiments as described herein. Node 205 may communicate in two directions; up-down, and left-right. These two directions may be generally described as a "first" direction and a "second" direction. Network 200 may also be generalized so that each node 205 may interface with more or less network nodes. For example, if multiple grids, as illustrated in FIG. 2 are overlaid on top each other then a node 205 may communicate in three directions; up-down, left-right, and to an upper grid and a lower grid (not shown). Similarly, if diagonal communication is also permitted, further links may be made based on positional location.

A satellite network as illustrated in FIGS. 1A, 1B, and 1C is an example of a network or a portion of a network that uses a grid topology. A satellite may communicate intra-orbit with other satellites in the same orbit as itself, northwards and southwards. The satellite may also communicate inter-orbit with satellites in adjacent orbits to the east and west of its own orbit. In other case, a satellite may also have a fifth, ground link. In other cases, satellite orbits may be located at different altitudes above earth and provide links to lower or higher altitude orbits. Though these networks differ in topology, they are all examples of grid networks based and communications between nodes may be conducted using positional location of the nodes.

Figure 3:
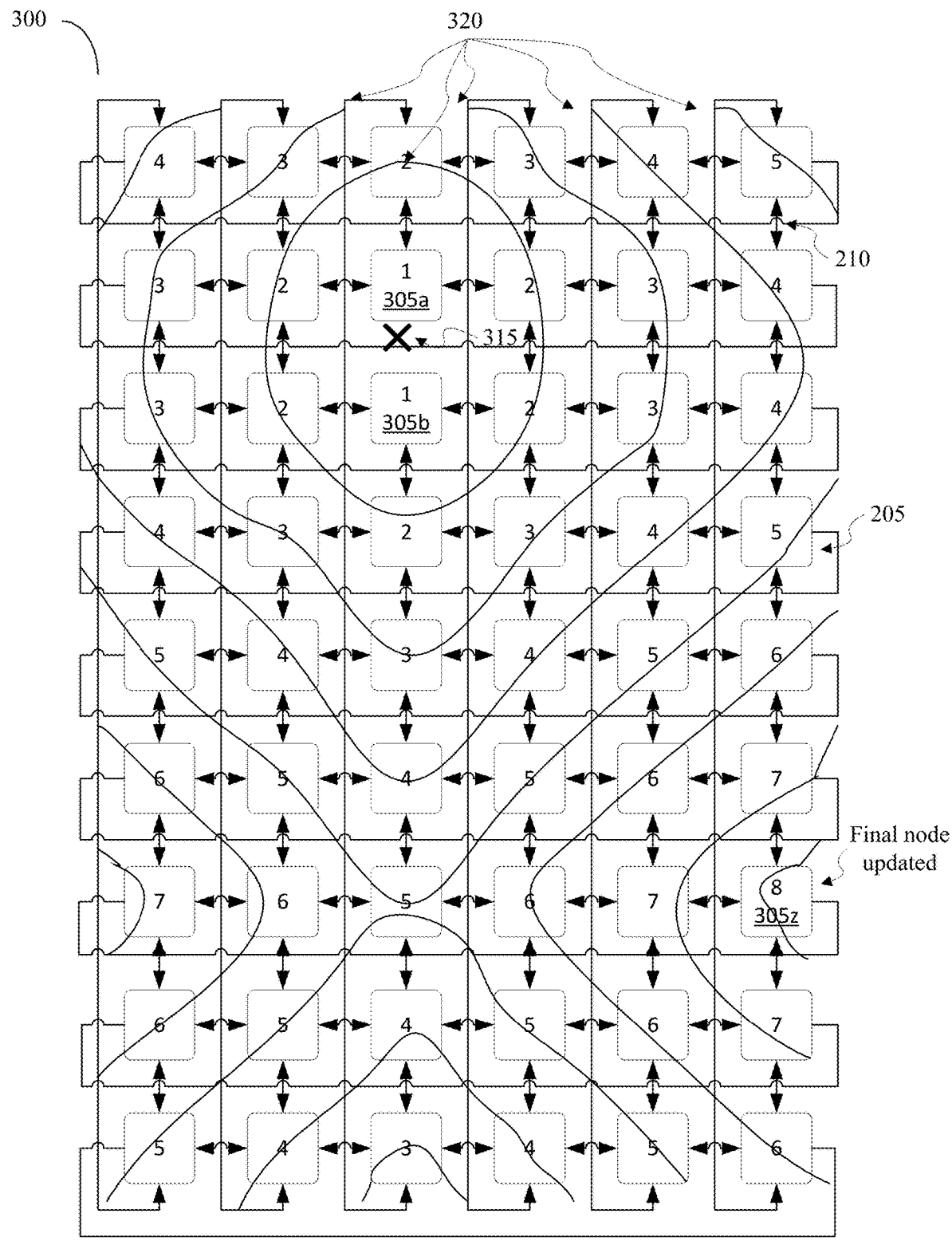
FIG. 3 illustrates another example of a network implementing conventional flooding.

FIG. 3 illustrates another example of a network 300 implementing conventional flooding. In this case, nodes at the top of the figure are directly connected via links to nodes at the bottom, and nodes at the left of the figure are directly connected via links to nodes at the right. This scenario is applicable to a spherical network topology, such as a global network of satellites. Upon failure of a link 315, the nodes 305a, 305b initiate a flooding procedure for propagating new link state information through the network. The final node to be updated is node 305z. Numbers in each node represent the number of steps of the repeated flooding procedure (the number of nodes the control plane message passes through) before that node receives the new link state information. Lines 320 connect nodes that are updated at substantially the same time.

The control plane messaging procedure may occur according to the OSPF protocol, which requires control plane processing of link state update messages at each node before forwarding. For example, a node in receipt of the LSA message may be required to pass the message to the control plane for processing, in order to determine whether further action is needed and if the packet should be forwarded or not. This control plane processing requirement adds significant delay and slows propagation of the link state update messages in the conventional node-by-node manner. A control plane message may be communicated using the same resources as data plane messages; however, such messages are marked so that, upon receipt by a node, they are diverted for internal processing by that node, according to one or more control plane procedures. The control plane procedures may include, for example, opening the message and processing its contents, and performing one or more control plane actions based on the processing. Control plane actions may include determining whether to update routing rules, routing tables, network representations, etc., and determining whether or not to re-submit the message for forwarding to other nodes. Notably, these control plane procedures can occur at every node which handles the message.

At a given node, the node-by-node flooding procedure can be described generally as transmitting, using control plane messaging, one or more messages to further network nodes which are local to the given network node. Local typically refers to direct connection via communication links. The messages indicate a link state change and are usable for updating routing rules at the further network nodes. The further network nodes may be configured to propagate, where necessary, the one or more messages to additional network nodes which are local to them. Additionally, or alternatively, the flooding procedure can be described as being an operation in which messages are propagated, via control plane messaging, outward from the given network node to further network nodes which are local to the given network node. The messages indicate the link state change and are usable for updating routing rules at the second network nodes.

In some embodiments, a node that is in proximity to a non-satellite node on the surface or the earth, such as a ground station, will transmit messages indicating a link state change that is usable for updating routing rules and communicating the satellite constellation status to the ground station. In other embodiments, a ground station that is in proximity to a satellite node will transmit messages indicating a link state change that is usable for updating routing rules to that satellite node.

Embodiments of the present invention are directed to the distribution of Link State Advertisement (LSA) messages in a network which may happen during and after changes in a topology occur. In a terrestrial mesh network, some nodes will receive duplicate LSAs from multiple sources, however, the flow direction is generally outward from the source of the topology change, such as a link failure. However, in the case of satellite networks, satellites in an orbit will represent ring structures and a failure will result in propagation of messages in two or more directions along the ring or between rings. Embodiments limit the number of duplicated LSA messages in a satellite network thereby limiting CPU processing power required to process LSAs and reduce the bandwidth required to communicate LSAs. Embodiments limit the duplication of LSAs in cases where a broken or inactive link limits the flow of LSAs. In cases, this may cause some duplication of individual LSAs though the overall number of LSAs related to the topology update is reduced.

Embodiments include additions to commonly used link state flooding procedures such as OSPF. In such protocols, LSA messages convey information needed by the network elements to calculate the network topology. Embodiments provide the ability to pro-actively steer LSA messages through the network to adjust the number of LSA messages and the rate of convergence of topology updates in the network.

In the general case of a flooding protocol, reception of an LSA, generally results in a broadcast-like forwarding of link state messages to adjacent nodes. In a satellite network with multiple satellites in adjacent orbits as illustrate in FIG. 1B, the network can be viewed as a grid based on cardinal direction relative to the earth below. In the case of a satellite network with orbits at different altitudes as illustrated in FIG. 1C, a network can be viewed as a grid based on altitude. In the case of a more complex satellite network combining the topologies of FIGS. 1B and 1C, the network can be viewed as a three-dimensional mesh. In a more complex or dense satellite network, satellites may have even more adjacent connections.

Figure 4:
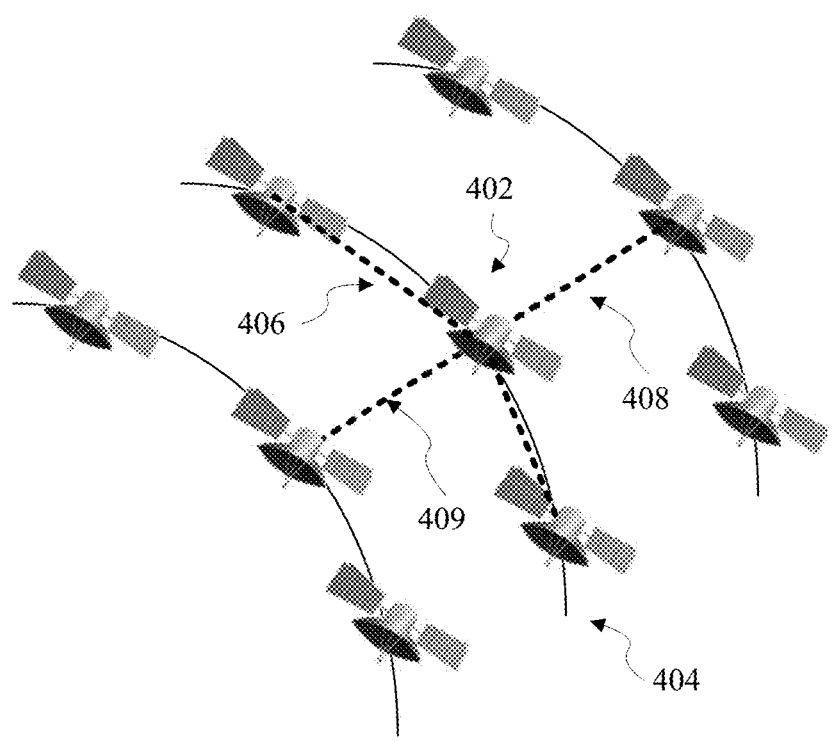
FIG. 4 illustrates inter-satellite links and orbital plane links.

For illustrative purposes, the satellite network can be viewed as a two-dimensional mesh as in the topology illustrated in FIG. 1B where each satellite can have an interface to its neighbors at the four cardinal points. As a result, an LSA message received on the east-facing interface may be forwarded to the west, north and south facing neighbors. FIG. 4 illustrates a portion of a two-dimensional mesh of satellites including a satellite 402 in a polar oriented orbit 404. The satellite 402 is connected to the next satellite in the same orbit 404 in the northerly direction and to the next satellite in the same orbit 404 in the southerly direction through intra-orbit links 406. The satellite 402 may also be connected to a satellite in the adjacent orbits in the east and west directions through inter-orbit links 408 and 409.

Figure 5:
FIG. 5 illustrates a link state update message with a message flag attached.

FIG. 5 illustrates an augmented LSA message 500 according to an embodiment where steering and controlling of LSA messages according to a flooding protocol comprises adding a flag field 502 to an LSA message 504 or transmitting the LSA message 504 together with its associated flag field 502. In embodiments, the LSA message 500 is a control message. The position of the flag field 502 is not limited and may be added as a prefix, a suffix, or at some other location in the LSA message 504. The flag field 502 includes forwarding instructions what are added or populated by a transmitting node to instruct a receiving satellite (node) to specify how the LSA message 504 is to be subsequently passed through the network. The bits of flag field 502 can indicate which network interfaces the satellite should forward the LSA information on. Flags can be used to indicate if an LSA message 504 should be transmitted in a particular direction or directions. Flags may also be used to indicate that an LSA message 504 should be sent across a seam the next time a satellite is near. Flags may be used to specify the immediate propagation of LSA messages or the delaying of the propagation of LSA messages. Flags may also be used to specify that an LSA message 504 should be sent to a ground station immediately or at the next available opportunity. Flags may be used to trigger actions described herein based on a set of criteria being satisfied. In the case of a satellite network, the flags 502 can be used to restrict the flow of messages to within a single orbital plane, or if they should be passed to the next orbital plane. Forwarding behavior could be different depending on whether the failure is due to a local failure, or due to a remote failure. A satellite may use local status information or local link information to decide whether to transfer received forwarding instructions as is, or to override or modify the forwarding instructions.

Though the description above refers to message flags 502, in embodiments, other methods may be used to communicate forwarding instructions such as type-length-value (TLVs), structures, objects, bitsets, as well as other methods as known in the art.

In an embodiment, when a link fault is detected at a satellite, the satellite will add flags to the LSA messages 504 so that the message is allowed to circulate to all nodes on the orbital plane, but transmission between planes would be restricted to one (or possibly a few) inter-orbit satellite links. This takes advantage of the fact that satellite data networks that are highly meshed have inherent redundancy due to their unique topology and reduces the overall processing of messages.

In embodiments, a satellite may utilize its knowledge of local link conditions to modify or replace received forwarding instructions. For example, when the network is not fully interconnected, a node can use its knowledge of the network topology and local fault conditions to add a flag field 502 to LSA messages 504 that instruct downstream nodes how to forward LSA messages to avoid known network faults.

The flag field 502 comprises a number of individual flag fields that may have specific defined meanings. As an example, a message flag 502 can be appended to a link state update message 504 as shown in FIG. 5. Within the flag field 502, two flags can be defined to specify if LSAs are to be passed on inter-satellite links 406 in the same orbital plane or on intra-satellite links 408 between different satellite planes, or in either or both directions.

Flag field 502 may also include an identifier such as a serial number, counter, or timer to allow for the selective enabling or suppressing of the propagation of the link state information over each network interface. This may be used to determine if a network node receives the same LSA message 500 twice and allow it to delete duplicate LSA messages. It may also allow for the deletion of LSA messages after a certain period of time or after an LSA message has been forwarded more than a predetermined number of times.

The flags 502 can be used to implement a set of rules to govern the distribution of LSA messages that can differ based on a number of parameters. One set of parameters may be the severity, location, and duration of a link failure. Another set may be the type, location, orbit, altitude or interface of the satellite that detects a link failure. In one example, the message generation differs depending on which interface encounters a failure. A general rule may allow LSA messages to be passed on in a first direction within the orbit (for example, over north-south interfaces), while inter-orbit propagation in a second direction, between orbital planes is limited to one or two links between orbital planes only. Furthermore, the inter-orbit passing of LSA messages can be specified to occur near poles in order to reduce the distance between satellites of adjacent orbits. In other embodiments it may be decides to avoid passing inter-orbit messages across a seam or alternatively, to set all satellites at the seam to pass flooding messages across the seam.

Some embodiments may have a different set of rules or different schedules based on the type of link failure. A degradation of a link may use different rules than a complete break of a link. Degradation of a link may mean a high error rate, a high latency, a low throughput or any degradation of a communication parameter of the link or system. A bidirectional failure may also be handled differently from a unidirectional failure where data may still be adequately transmitted in one direction.

For some satellite constellations inter-satellite links will be unstable in certain regions. For example, inter-satellite links across a seam are unstable since satellites in adjacent orbits are travelling in opposite directions and only in proximity for a short period of time. Furthermore, north-south orbits cross in the polar regions and a satellite to the east while in an ascending portion of the orbit will switch to the west in the descending portion of an orbit, and during the cross over period at a pole inter-orbit links are expected to momentarily drop in a predictable and periodic manner. It is advantageous to allow the flooding behavior of satellites operating in those regions to be different from satellites that may be operating in other regions of the constellation. Embodiments can specify that inter-orbit or intra-orbit forwarding is enabled or disabled within a specific region. Similarly, the behavior of links across a seam and the behavior of links to ground stations can be specified based on the knowledge of the satellites position, velocity, orbit, and capabilities, and the location and capabilities of ground stations.

Figure 6:
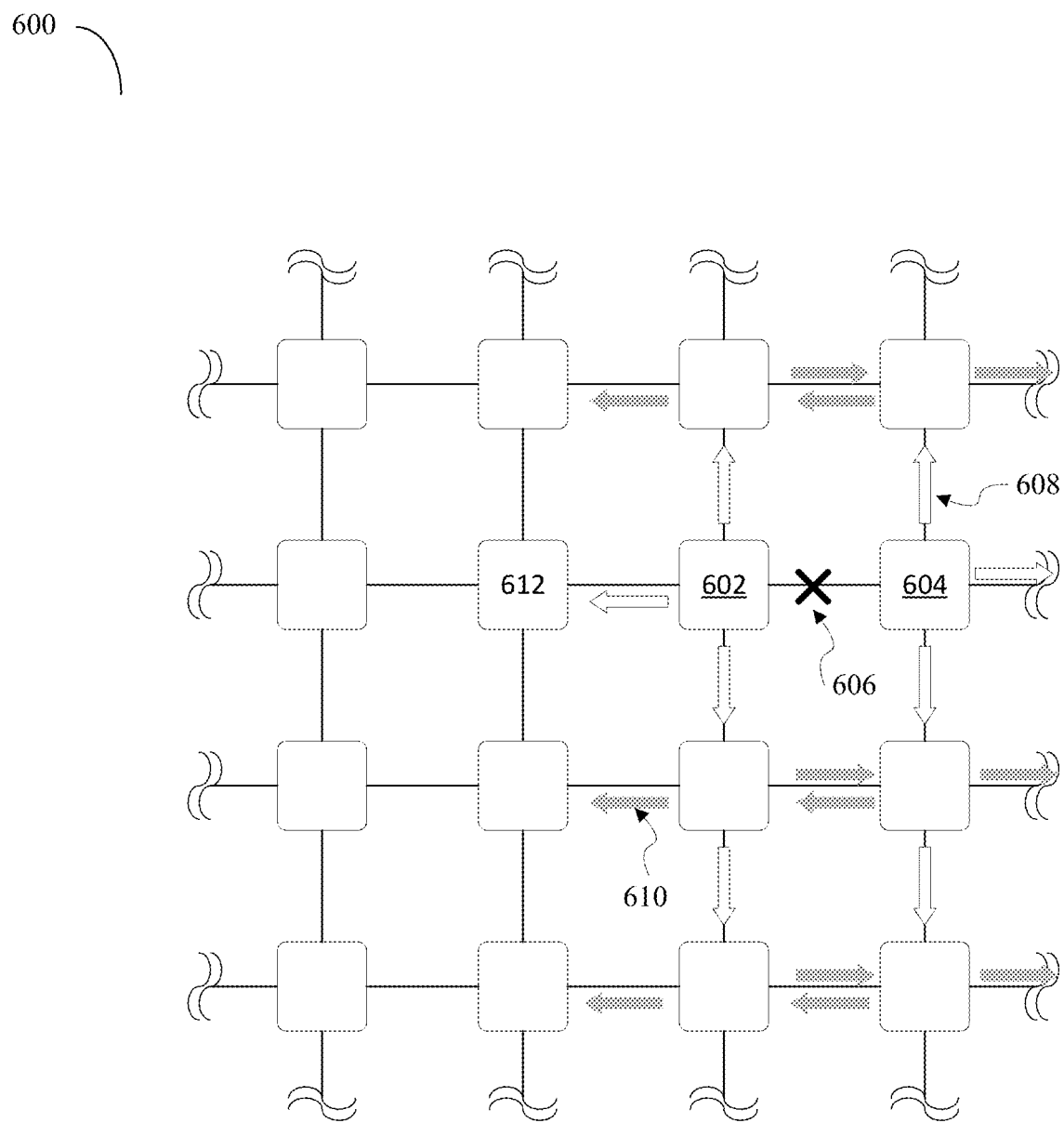
FIG. 6 provides an example of flooding behaviour during failure on horizontal plane.

FIG. 6 illustrates an example of flooding behavior during a failure in a horizontal plane according to an embodiment. In FIG. 6, horizontal planes may correspond to an east-west direction while vertical planes may correspond to a north-south direction. Each node, such as node 602 and node 604 may represent a satellite or may represent another type of network node using a similar grid topology. The horizontal link 606 between node 602 and node 604 has failed resulting in a need to update routing tables through the use of LSA messages. A link failure status is detected by node 602 and node 604 resulting in node 602 transmitting LSA messages in the north, west, and south directions. Node 604 also transmits LSA messages in the north, east, and south directions. Message flags 502 are added to the LSA messages to instruct receiving nodes in which directions to forward LSA messages. Message flags may be used to indicate a single cardinal direction, such as north, south, east, west, northwest, etc. They may also be used to indicate an axis, such as north-south, east-west, northwest-southeast, along an orbit, between orbits, higher altitude, lower altitude, etc. In this example, Node 602 forwards an LSA message in the north, west, and south directions. Node 604 forwards an LSA message in the north, east, and south directions. The northbound and southbound LSA messages have only the north and south flags set. The east and west messages have both north-south and east-west flags set. Once LSA messages are received from nodes to the east or west of them, these receiving nodes will transmit LSA messages with flags set for the north and south directions in order to route LSA message for intra orbit communication, as well as set both flags for east-west communications. Through the use of message flags, LSA message are only transmitted on links as indicated by white arrows 608 and suppressed on other links as indicated by grey arrows 610, thereby reducing the total number of LSA messages in the flood.

Figure 7:
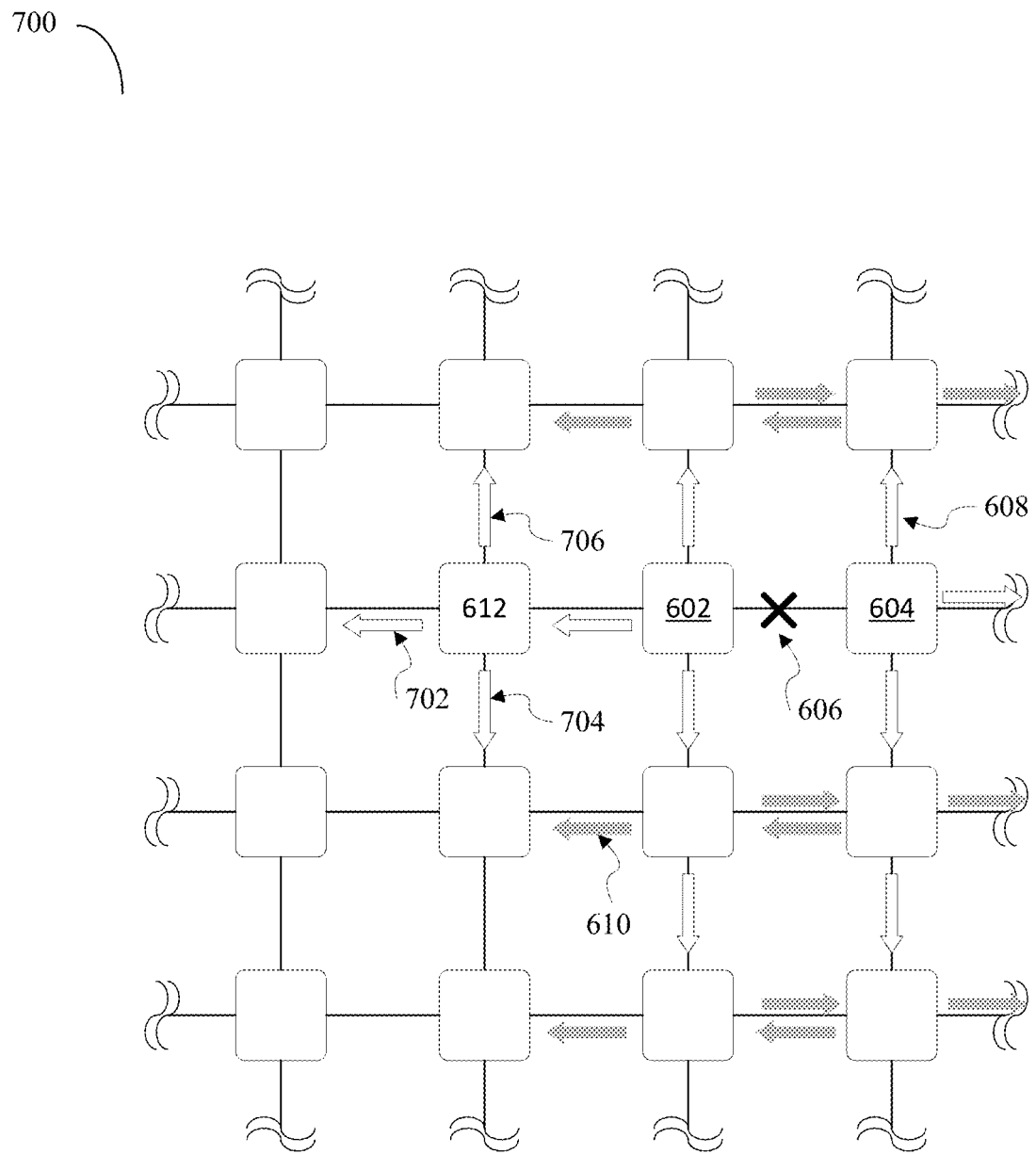
FIG. 7 provides an example of the use of message flags to limit flooding behaviour during failure in a horizontal plane.

FIG. 7 illustrates an example of the use of message flags 502 to limit the propagation of LSA messages according to an embodiment. The horizontal link 606 between node 602 and node 604 has failed resulting in a need to update routing tables through the use of LSA messages. A link failure status is detected by node 602 and node 604 resulting in node 602 transmitting LSA messages in the north, west, and south directions. Node 604 also transmits LSA messages in the north, east, and south directions. For LSA messages sent in the east or west directions, flags will be set in all four directions; north, south, east, and west. For LSA messages sent in the north and south directions, flags will be set only in the north and south directions.

When nodes in the east or west directions, such as node 612, receive the LSA message, they see that flags in both east-west and north-south directions are set. These nodes will turn off, or unset, flags in the east-west directions before forwarding LSA message to their neighbors to the north or south, such as along links 704 and 706. They transmit the message without any modification to their next east or west neighbor, such as along link 702, with flags set in the east-west and north-south directions as required. In this case, the flags may be simply transferred from the received LSA message received from node 602 to the transmitted LSA message on link 702. It should be noted that a node 612 receiving an LSA from one direction may choose to not transmit an LSA message back in that same direction. So, if a node receives an LSA direction from the west, it will not transmit or forward it back towards the east.

Through the use of message flags, LSA message are only transmitted on links as indicated by white arrows 608 and suppressed on other links as indicated by grey arrows 610, thereby reducing the total number of LSA messages in the flood.

Figure 8:
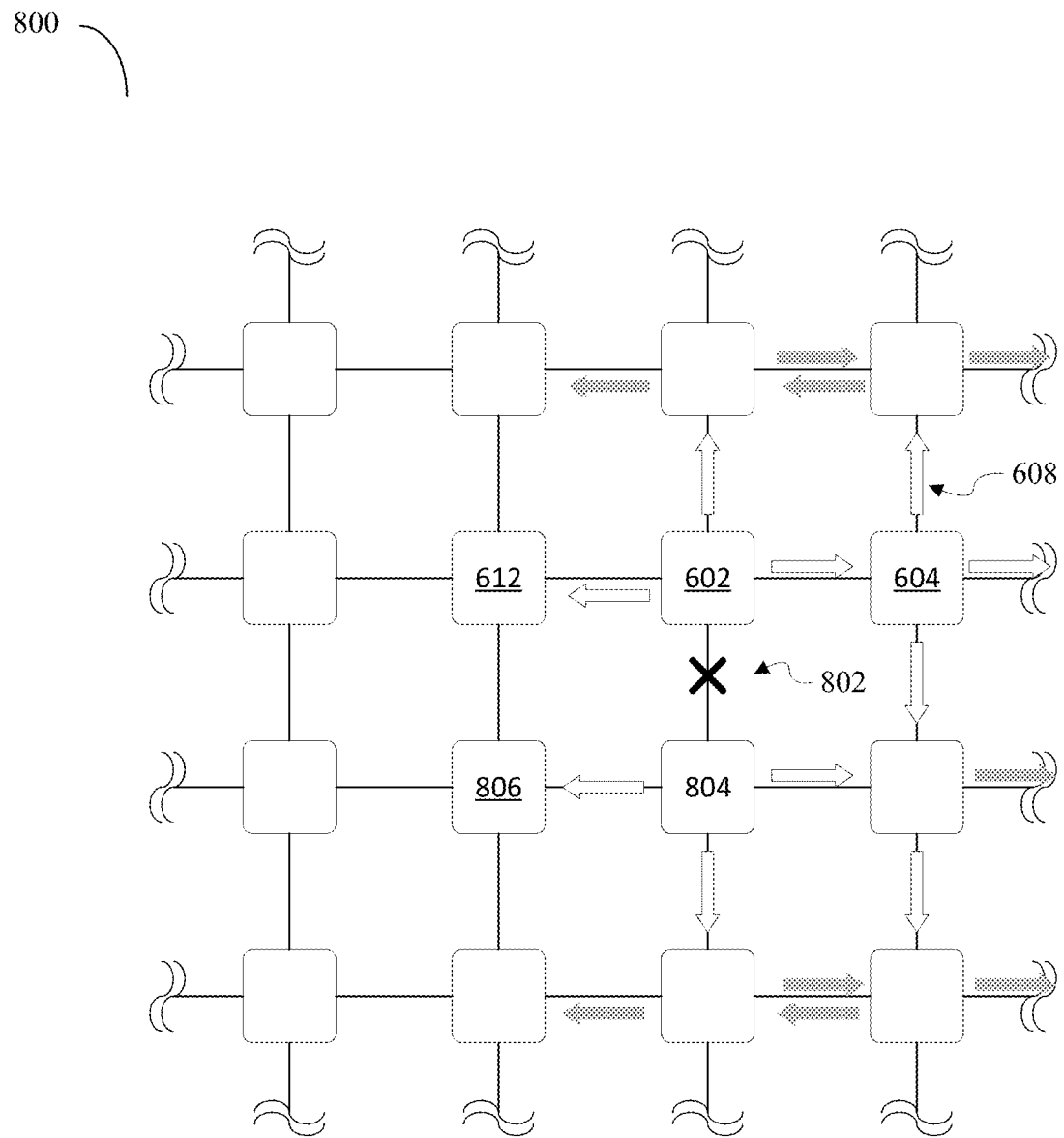
FIG. 8 provides an example of the use of message flags to limit flooding behaviour during failure in a vertical plane.

FIG. 8 illustrates an example of the use of message flags 502 to limit the propagation of LSA messages according to a further embodiment. The vertical link 802 between node 602 and node 804 has failed resulting in a need to update routing tables through the use of LSA messages. The link failure is detected by node 602 and node 804 resulting in node 602 transmitting LSA messages in the north, east, and west directions. Node 804 also transmits LSA messages in the east, west, and south directions. Message flags 502 are added to the LSA messages to control the amount and direction of the LSA messages. At the nodes that detect the failure, nodes 602 and 804, messages propagated in the north-south direction have the flags set to indicate that subsequent nodes need to forward in the north-south direction only. The nodes also send the messages in the east-west direction, for example node 602 will send LSA messages to nodes 604 and 612. In this case, the flags will be set to send LSA message in both the north-south and east-west directions. A node receiving an LSA message with this set of flags will forward the LSA message in the north-south direction with the north-south flag set and east-west with the north-south and east-west flags set. In this example, multiple LSA messages are sent in the horizontal, east-west direction, where one may suffice. This can decrease the amount of time required to propagate LSA messages through the network at the expense of additional LSA messages being sent.

In some embodiments, the message flags 502 may include a priority flag to give priority to links in a certain direction or that match a set of criteria. Transmitting nodes may set a priority bit while receiving nodes may process LSA messages differently depending on the status of the priority bit.

In some embodiments, message flags may be used to direct the flow of LSA messages to, or away from, a specific location in the network, (for example to an area where there is significant traffic to be impacted by the network disruption. Message flags may also be used to implement source routing to provide a list of nodes in that should be traversed.

In embodiments, message flags 502 are added to the LSA messages 504 at the transmitting node. The message flags 502 specify the direction used by transmitting nodes to transmit LSA messages across interfaces that are connected to satellites that are in the same orbit. LSA messages may be used to limit the number of satellites that forward LSA messages to adjoining orbital planes.

In other embodiments, in order to accommodate the loss of inter-orbit links at a polar region, the satellite may handoff generation to another satellite in the same orbit. This can be done either at a pre-defined time, a pre-defined position (latitude), or based on a message passed over a management link that can exist between the two satellites. LSA messages 504 and message flags 502 can be further extended with additional data that could contain detailed configuration instructions or parameters. This additional data may be appended or included with the message flags 502 or as part of the LSA message 504 and may be used in addition to or instead of a management link.

In the case of LSA messages 502 being sent between satellites on either side of the orbital seam, they may be configured to send link state updates over multiple inter-satellite links. Since the links crossing the seam are only available when satellites pass each other in opposing directions, using multiple links increases the reliability of communications for messages that cross the seam, at the expense of generating multiple LSA messages 502. At the receiving side of the seam, the first message across the seam may then propagate to other satellites in the same orbit. Subsequent messages received over other inter-satellite links at other cross-seam nodes add redundancy or message flags may be updated to instruct nodes to discard redundant LSA messages.

In order to reduce the number LSA messages, additional information may be passed in the flag field that can be used by receiving nodes to suppress propagation of further messages. This additional information may comprise a link failure identifier that can be associated with a specific link failure which can be used by a downstream node to ignore a link state message that is known to be duplicated. While this can be done using higher layer link state protocols, providing this in the flag field reduces the processing overhead of detecting LSA messages known to contain information previously contained in other messages, which may help to reduce CPU load and power consumption. For example, with reference to FIG. 8, both nodes 602 and 804 will send an LSA message indicating the loss of link 802. If these LSA messages include the same link failure identifier, then additional nodes may have the ability to detect this and ignore the second LSA. Since the ability to detect LSA messages that result from the loss of the same link, or the same topology change, may only be needed on certain satellites, these dedicated hardware or software resources can be shut down or put into a low power standby mode if not required.

The construction of a link failure identifier may use a combination of a network node address and a counter. Each link failure can increment a counter and when combined with the address forms a globally unique indicator that can be used to determine if a message has been previously processed. Since link failures typically last longer than the convergence time of routing table updates of a large network, the number of bits needed for the counter can be small but should take into consideration the number of links per node and the number of nodes in the network. For example, in the case of a 15,000 node network, a two byte register can uniquely identify 60,000 link update events.

Figure 9:
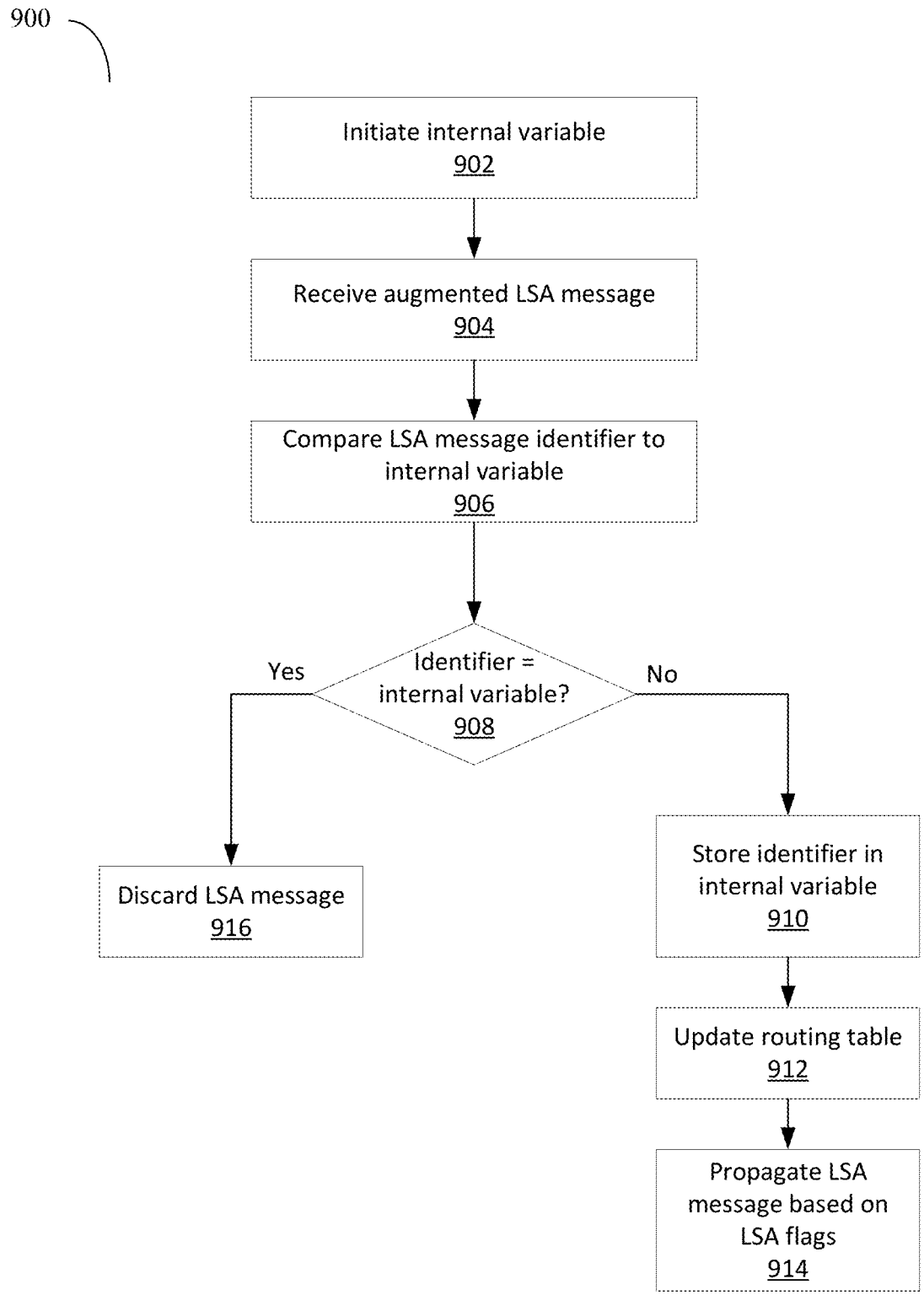
FIG. 9 illustrates a method for processing LSA messages according to an embodiment of the present invention.

Some embodiments include the process 900 as illustrated in FIG. 9. This method may be used to control the propagation of LSA messages, such as when LSA messages are propagated across a seam, on in other cases where it is advantageous for a node to detect when it has received multiple LSA messages regarding the same update event. In these cases, a node may be configured to only propagate the first LSA message it receives for each update event. Each node in the network is identified with a unique identifier. In step 902, each node maintains an internal variable that is initially set to zero or a null value. When a node receives an LSA message in step 904, it compares the identifier to the internal variable in step 906. In step 908 if the value received is different from what is stored in the internal variable in memory, then in step 910 the received identifier is used to update the internal variable, and in step 912 the received LSA message is used to update the routing table. In step 914 the node generates an LSA update together with the appropriate flag value set (e.g., to pass within the orbit, or to pass across the inter-satellite link to the next orbit, or both). If the value received is equal to the value stored in memory, then in step 916 it may ignore the link state update, as it has already been processed, and the LSA message may be discarded. In some embodiments, the order in which steps 910, 912, and 914 may be reordered. In some embodiments, the use of the process 900 allows a satellite node to omit the logging of LSA messages and routing update events which may free up memory for other tasks and events.

Figure 10:
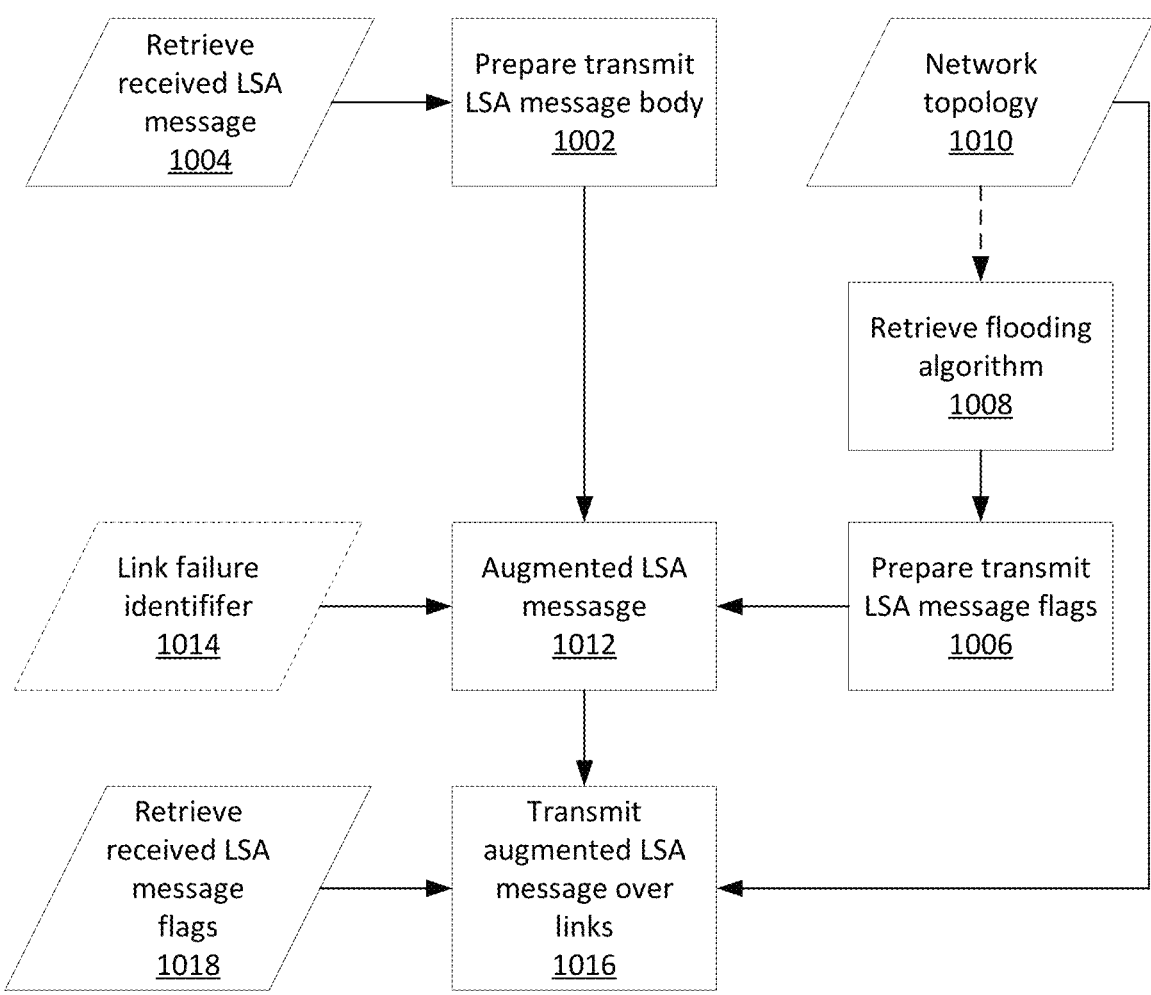
FIG. 10 illustrates a method for forwarding LSA messages according to an embodiment of the present invention.

FIG. 10 expands on step 914 of FIG. 9 and illustrates a method used by a network node to forward an augmented LSA message in response to receiving an LSA message from another network node, according to an embodiment. In step 1004, the received LSA message is retrieved for use in step 1002 where the LSA message body 504 is prepared. In step 1012 an augmented LSA is prepared by adding message flags 502. Message flags 502 are prepared in step 1006 based on flooding algorithm 1008 which optionally takes into account the network topology from step 1010. Optionally, a link failure identifier 1014 may be added to the augmented LSA message. In step 1016, the augmented LSA, including the LDA message body 504 and the message flags 502, is transmitted over message links. In step 1018, the links that the augmented LSA message are to be transmitted over are determined based on the LSA message flags from the received LSA message.

Figure 11:
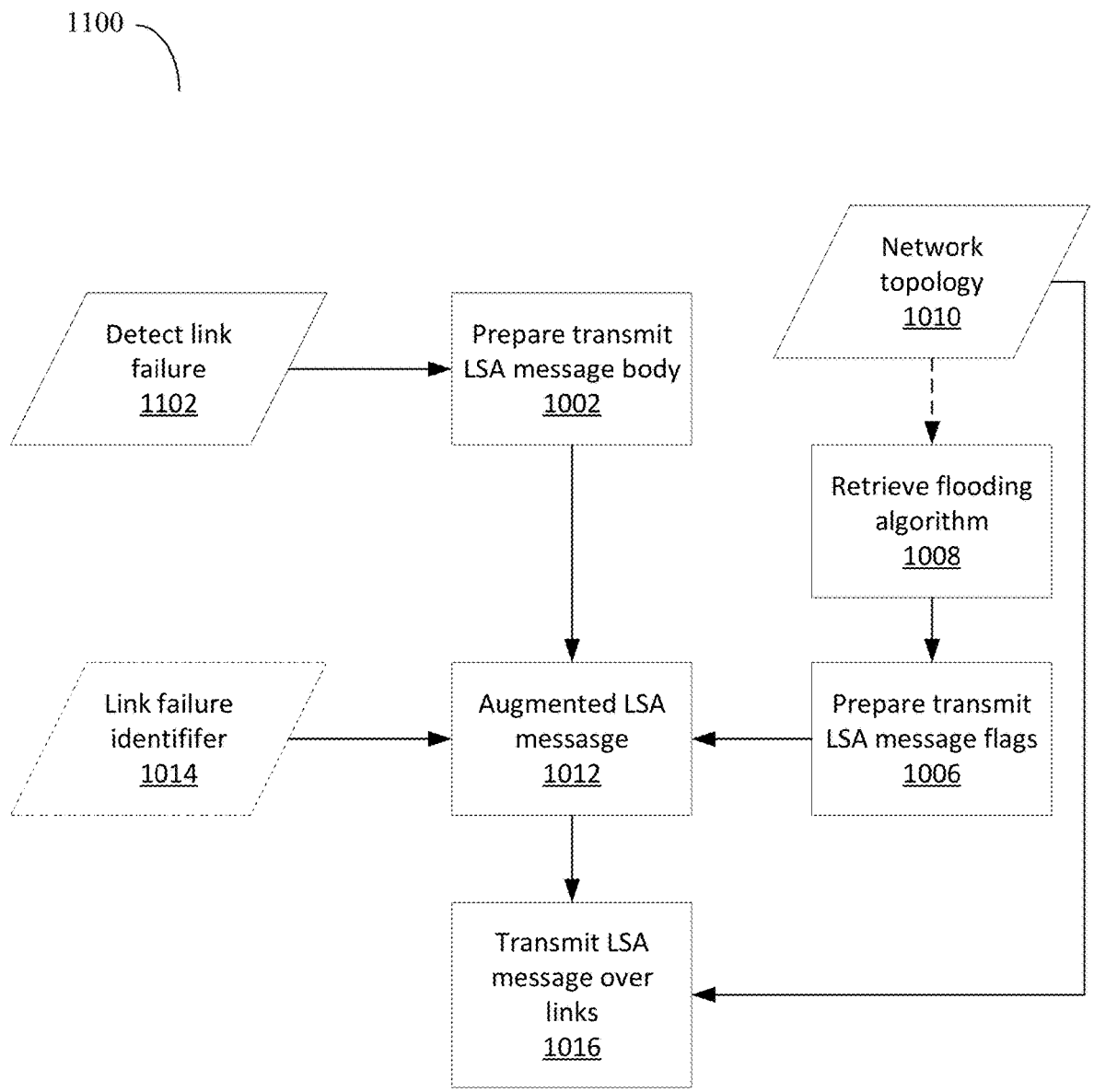
FIG. 11 illustrates a method for initiating LSA messages according to an embodiment of the present invention.

FIG. 11 illustrates a method used by a network node to initiate an augmented LSA message when detecting a link failure, according to an embodiment. In step 1102, the network node detects a link failure or receives a message or an indication of a link failure. In step 1002, the LSA message body 504 is prepared. In step 1012 an augmented LSA is prepared by adding message flags 502. Message flags 502 are prepared in step 1006 based on flooding algorithm 1008 which optionally takes into account the network topology from step 1010. Optionally, a link failure identifier 1014 may be added to the augmented LSA message. In step 1016, the augmented LSA, including the LSA message body 504 and the message flags 502, is transmitted over message links.

Figure 12:
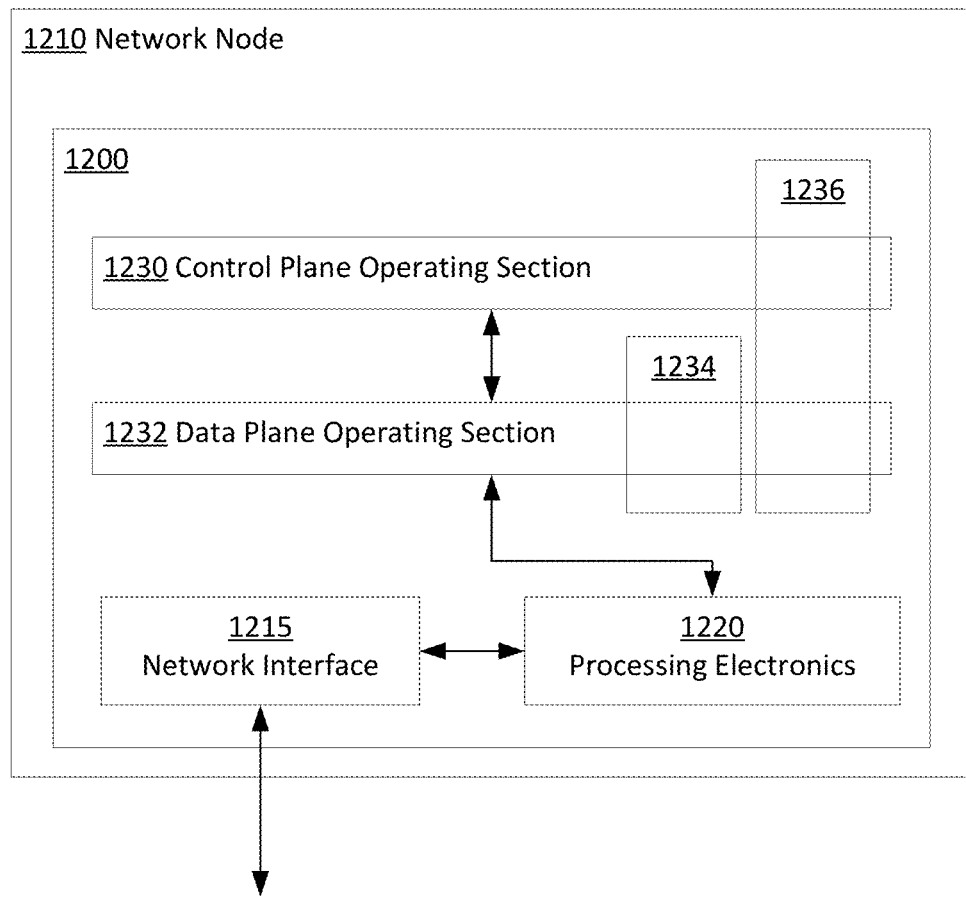
FIG. 12 illustrates a network node apparatus provided in accordance with embodiments of the present invention.

FIG. 12 illustrates an apparatus 1200 provided in accordance with embodiments of the present invention. The apparatus is included as part of a network node 1210, such as a satellite, of a communication network. The apparatus includes a network interface 1215 (of the network node) and processing electronics 1220. The processing electronics can include a computer processor executing program instructions stored in memory. The processing electronics can include dedicated electronics, such as provided by a field programmable gate array, application specific integrated circuit, or other digital or analog electronic circuitry.

The apparatus can include a control plane operating section 1230 and a data plane operating section 1232. The control plane operating section 1230 may update routing tables and maintain representations of network topologies in response to received messages indicative of link state changes. The control plane operating section may determine whether to forward such messages, for example based on whether a duplicate version of the message has been previously received. In embodiments, the augmented LSA message 500 of FIG. 5 is a control plane message. The data plane operating section 1232 may receive messages and determine whether the messages are to be forwarded immediately based on address or sent to the control plane operating section for further processing. The data plane operating section may identify and send link state change messages to the control plane operating section. The data plane operating section transmits messages based on routing information maintained by the control plane operating section.

The apparatus can include a link state change flooding operating section 1234 and a flag operating section 1236. These operating sections are aspects arising from cooperation of the control plane operating section 1230 and data plane operating section 1232. The link state change flooding operating section 1234 operates to initiate, handle, propagate or terminate control plane messages indicative of link state changes according to a flooding protocol as described elsewhere herein. The flag operating section 1236 operates to interpret received LSA flags and generate LSA flags for LSA messages that are propagated.

Figure 13:
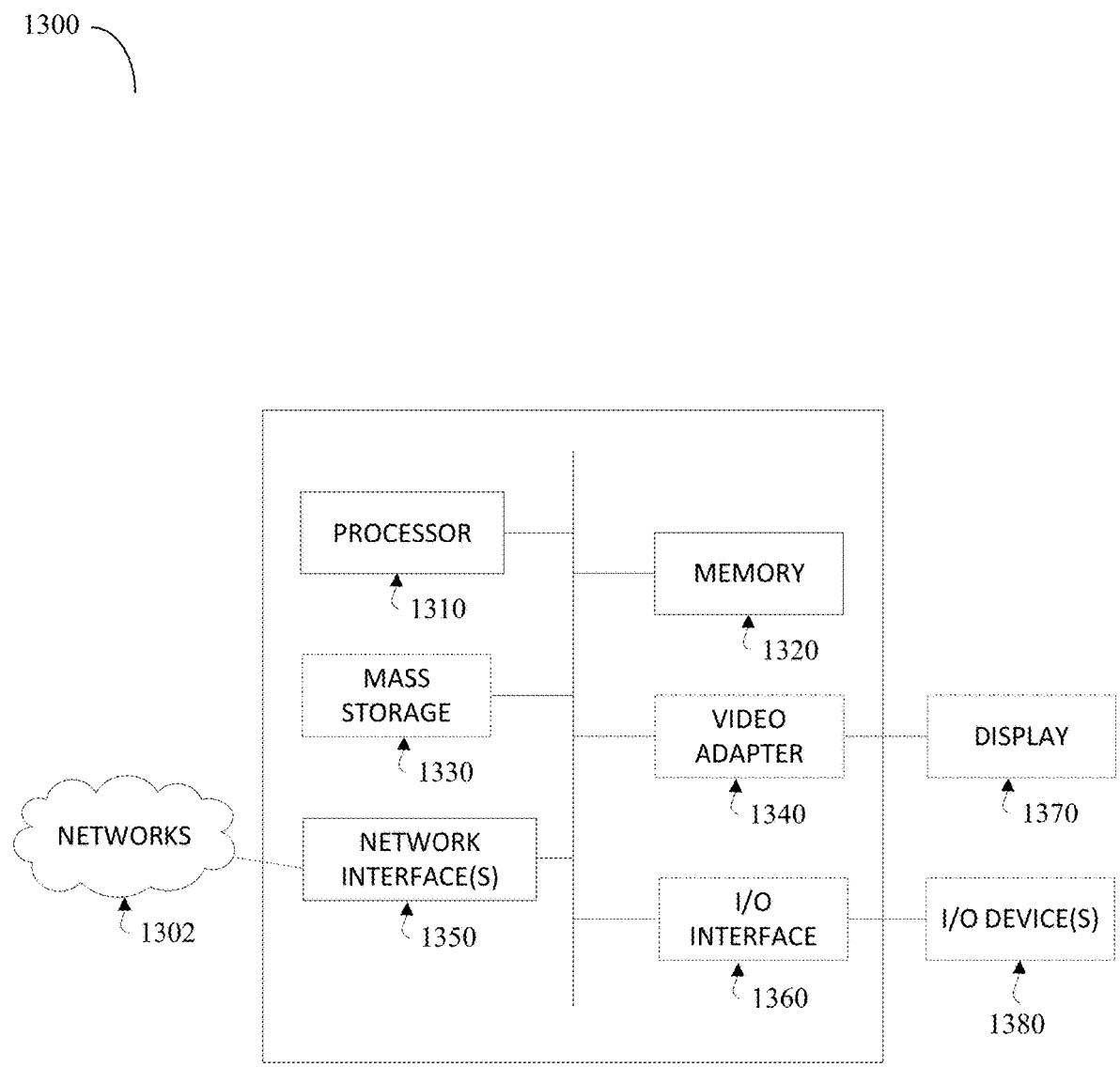
FIG. 13 is a diagram of an electronic device that may perform any or all of operations of the above methods and features explicitly or implicitly described herein, according to different embodiments of the present invention.

FIG. 13 is a schematic diagram of an electronic device 1300 that may perform any or all of operations of the above methods and features explicitly or implicitly described herein, according to different embodiments of the present invention. For example, a computer equipped with network functions may be configured as electronic device 1300.

As shown, the device includes a processor 1310, such as a Central Processing Unit (CPU) or specialized processors such as a Graphics Processing Unit (GPU) or other such processor unit, memory 1320, non-transitory mass storage 1330, I/O interface 1340, network interface 1350, and an I/O interface 1360, all of which are communicatively coupled via bidirectional bus. According to certain embodiments, any or all of the depicted elements may be utilized, or only a subset of the elements. Further, the device 1300 may contain multiple instances of certain elements, such as multiple processors, memories, or transceivers. Also, elements of the hardware device may be directly coupled to other elements without the bidirectional bus. Additionally, or alternatively to a processor and memory, other electronics, such as integrated circuits, may be employed for performing the required logical operations.

The memory 1320 may include any type of non-transitory memory such as static random access memory (SRAM), dynamic random access memory (DRAM), synchronous DRAM (SDRAM), read-only memory (ROM), any combination of such, or the like. The mass storage element 1330 may include any type of non-transitory storage device, such as a solid state drive, hard disk drive, a magnetic disk drive, an optical disk drive, USB drive, or any computer program product configured to store data and machine executable program code. According to certain embodiments, the memory 1320 or mass storage 1330 may have recorded thereon statements and instructions executable by the processor 1310 for performing any of the aforementioned method operations described above.

As used herein, the term "about" should be read as including variation from the nominal value, for example, a +/−10% variation from the nominal value. It is to be understood that such a variation is always included in a given value provided herein, whether or not it is specifically referred to.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for distributing link state information in a network, the method comprising:

receiving, by a first node, from a second node, a first control message including the link state information and a first set of forwarding instructions for selecting a network interface from a plurality of network interfaces to use to further propagate the link state information; and sending over the selected network interface, by the first node, to a third node, based on the first set of forwarding instructions and a status of the plurality of network interfaces, a second control message including the link state information and a second set of forwarding instructions, the second set of forwarding instructions based on the first set of forwarding instructions and a positional location of the third node within the network, wherein the plurality of network interfaces includes a network interface connected in a first direction and a network interface connected in a second direction, further comprising the first node determining a status of each of the plurality of network interfaces, and wherein at least one portion of the network having dynamically varying topologies, and wherein the second set of forwarding instructions are derived from the first set of forwarding instructions modified based on the status of one or more of the plurality of network interfaces, and based on a predicted topology of the network, the predicted topology taking into account relative position and velocity of the nodes.

2. The method of claim 1, wherein the first set of forwarding instructions instructs the first node to select one of the plurality of network interfaces connected in the first direction, the method further comprising:

transferring the first set of forwarding instructions to the second set of forwarding instructions.

3. The method of claim 1, wherein the first set of forwarding instructions instructs the first node to select a first of the plurality of network interfaces connected in the first direction and a second of the plurality of network interfaces connected in the second direction, the method further comprising:

transferring the first set of forwarding instructions to the second set of forwarding instructions, the second control message being sent on one of the plurality of network interfaces in the second direction; and sending over a selected network interface in the first direction, to a fourth node, a third control message including the link state information and a third set of forwarding instructions, the third set of forwarding instructions instructing the fourth node to forward the link state information in the first direction.

4. The method of claim 1, wherein the network has a grid topology, and the plurality of network interfaces are interfaces pointing in positional directions.

5. The method of claim 4, wherein the network is a satellite network, the first node is a satellite positioned in an orbit of the network, the first direction is within the orbit, and the second direction is between the orbit and an adjacent orbit of the network.

6. The method of claim 1, wherein the first set of forwarding instructions is communicated using at least one of the following techniques:
- flags;
- type-length-value (TLVs);
- structures;
- objects; or
- bitsets.

7. The method of claim 1, wherein the first set of forwarding instructions includes an identifier for selectively enabling or suppressing the propagation of the link state information over each network interface.

8. A network node configured to distribute link state information in a network, the network node comprising:
- a processor coupled to a plurality of network interfaces and a computer readable storage medium, the storage medium storing instructions that, when executed by the processor, cause the network node to:
  - receive, from a second node, a first control message including the link state information and a first set of forwarding instructions for selecting a network interface from the plurality of network interfaces to use to further propagate the link state information; and
- send over the selected network interface to a third node, based on the first set of forwarding instructions and a status of the plurality of network interfaces, a second control message including the link state information and a second set of forwarding instructions, the second set of forwarding instructions based on the first set of forwarding instructions and a positional location of the third node within the network;
- wherein the plurality of network interfaces include a network interface connected in a first direction and a network interface connected in a second direction, further comprising determining a status of each of the plurality of network interfaces, and wherein at least one portion of the network having dynamically varying topologies, and
- wherein the second set of forwarding instructions are derived from the first set of forwarding instructions modified based on the status of one or more of the plurality of network interfaces, and based on a predicted topology of the network, the predicted topology taking into account relative position and velocity of the nodes.

9. The network node of claim 8, wherein the first set of forwarding instructions instructs the network node to select one of the plurality of network interfaces connected in the first direction, and the instructions, when executed by the processor, further cause the network node to:
- transfer the first set of forwarding instructions to the second set of forwarding instructions.

10. The network node of claim 8, wherein the first set of forwarding instructions instructs the network node to select a first of the plurality of network interfaces connected in the first direction and a second of the plurality of network interfaces connected in the second direction, and the instructions, when executed by the processor, further cause the network node to:
- transfer the first set of forwarding instructions to the second set of forwarding instructions, the second control message being sent on one of the plurality of network interfaces in the second direction; and
- send over a selected network interface in the first direction, to a fourth node, a third control message including the link state information and a third set of forwarding instructions, the third set of forwarding instructions instructing the fourth node to forward the link state information in the first direction.

11. The network node of claim 8, wherein the network has a grid topology, and the plurality of network interfaces are interfaces pointing in positional directions.

12. The network node of claim 11, wherein the network is a satellite network, the network node is a satellite positioned in an orbit of the network, the first direction is within the orbit, and the second direction is between the orbit and an adjacent orbit of the network.

13. The network node of claim 8, wherein the first set of forwarding instructions is communicated using at least one of the following techniques:
- flags;
- type-length-value (TLVs);
- structures;
- objects; or
- bitsets.

14. The network node of claim 8, wherein the first set of forwarding instructions includes an identifier for selectively enabling or suppressing the propagation of the link state information over each network interface.

15. A system configured to distribute link state information within a network, the system comprising:
- a plurality of nodes including a first node, a second node, and a third node, each of the plurality of nodes comprising a processor coupled to a plurality of network interfaces and a computer readable storage medium, the storage medium storing instructions that when executed by the processor, cause the plurality of nodes to:
  - receive, by the first node, from the second node a first control message including the link state information and a first set of forwarding instructions for selecting a network interface from the plurality of network interfaces to use to further propagate the link state information; and
  - send over the selected network interface, by the first node, to the third node, based on the first set of forwarding instructions and a status of the plurality of network interfaces, a second control message including the link state information and a second set of forwarding instructions, the second set of forwarding instructions based on the first set of forwarding instructions and a positional location of the third node within the network;
- wherein the plurality of network interfaces include a network interface connected in a first direction and a network interface connected in a second direction, further comprising determining a status of each of the plurality of network interfaces, and wherein at least one portion of the network having dynamically varying topologies, and
- wherein the second set of forwarding instructions are derived from the first set of forwarding instructions modified based on the status of one or more of the plurality of network interfaces, and based on a predicted topology of the network, the predicted topology taking into account relative position and velocity of the nodes.

16. The system of claim 15, wherein the first set of forwarding instructions instructs the first node to select one of the plurality of network interfaces connected in the first direction, the instructions that when executed by the processor, further causing the plurality of nodes to:
- transfer the first set of forwarding instructions to the second set of forwarding instructions.

17. The system of claim 15, wherein the first set of forwarding instructions instructs the first node to select a first of the plurality of network interfaces connected in the first direction and a second of the plurality of network interfaces connected in the second direction, the instructions that when executed by the processor, further causing the plurality of nodes to:
- transfer the first set of forwarding instructions to the second set of forwarding instructions, the second control message being sent on one of the plurality of network interfaces in the second direction; and
- send over a selected network interface in the first direction, to a fourth node, a third control message including the link state information and a third set of forwarding instructions, the third set of forwarding instructions instructing the fourth node to forward the link state information in the first direction.

18. The system of claim 15, wherein the network has a grid topology, and the plurality of network interfaces are interfaces pointing in positional directions.

19. The system of claim 18, wherein the network is a satellite network, the first node is a satellite positioned in an orbit of the network, the first direction is within the orbit, and the second direction is between the orbit and an adjacent orbit of the network.

20. The system of claim 15, wherein the first set of forwarding instructions is communicated using at least one of the following techniques:
- flags;
- type-length-value (TLVs);
- structures;
- objects; or
- bitsets.

* * * * *